United States Patent [19]
Foster et al.

[11] 4,131,003
[45] Dec. 26, 1978

[54] SEMIAUTOMATIC CONTROL SYSTEM FOR TUBE BENDING MACHINE

[75] Inventors: Gene B. Foster, Seattle; Charles M. Baker, Kirkland, both of Wash.

[73] Assignee: The Boeing Company, Seattle, Wash.

[21] Appl. No.: 804,352

[22] Filed: Jun. 7, 1977

[51] Int. Cl.² ............................................. B21D 7/12
[52] U.S. Cl. ............................................ 72/7; 72/11; 72/33; 72/297
[58] Field of Search ..................... 72/7, 10, 11, 12, 22, 72/30, 31, 32, 149, 297, 306, 307, 217, DIG. 22

[56] References Cited

U.S. PATENT DOCUMENTS

| 3,387,473 | 6/1968 | Noordhoek et al. | 72/32 |
|---|---|---|---|
| 3,618,349 | 11/1971 | Roch | 72/7 |
| 3,766,764 | 10/1973 | Ross et al. | 72/22 |
| 3,808,856 | 5/1974 | Lance | 72/7 |
| 3,821,525 | 6/1974 | Eaton et al. | 72/8 |
| 3,974,676 | 8/1976 | Eaton | 72/307 |

*Primary Examiner*—Michael J. Keenan
*Attorney, Agent, or Firm*—Christensen, O'Connor, Johnson & Kindness

[57] ABSTRACT

An operator's console is used to produce, and control the storage of, bend data including: bend number, linear position, rotational position, bend angle and final bend number. The bend data is inserted either manually via a keyboard or by a reader reading a suitable data source (e.g., an optical reader reading punched cards). After all of the bend data is produced, checked and stored, the operator's console displays the first set of bend data. The operator then manually moves the tube, both linearly and rotationally, until the tube is suitably positioned. Encoders mounted so as to detect the rotational and linear position of the tube create related linear and rotational position displays during manual positioning. When the tube reaches the appropriate linear and rotational positions, linear and rotational brakes are actuated and lock the tube in position. When the tube is appropriately positioned (brakes locked), the encoder (actual tube position) displays correspond to the related memory displays. Thereafter, the operator actuates a switch, which causes the tube to be bent. After the first bend is made, the next set of bend data stored in memory is automatically displayed and the sequence is repeated. After the final bend is made, the bent tube is removed by the operator. Preferably, visual and/or audio alarms are actuated to warn the operator when the linear and rotational positions are being approached, during the manual tube positioning step of the sequence; and, ready lights are lit when the brakes lock.

31 Claims, 14 Drawing Figures

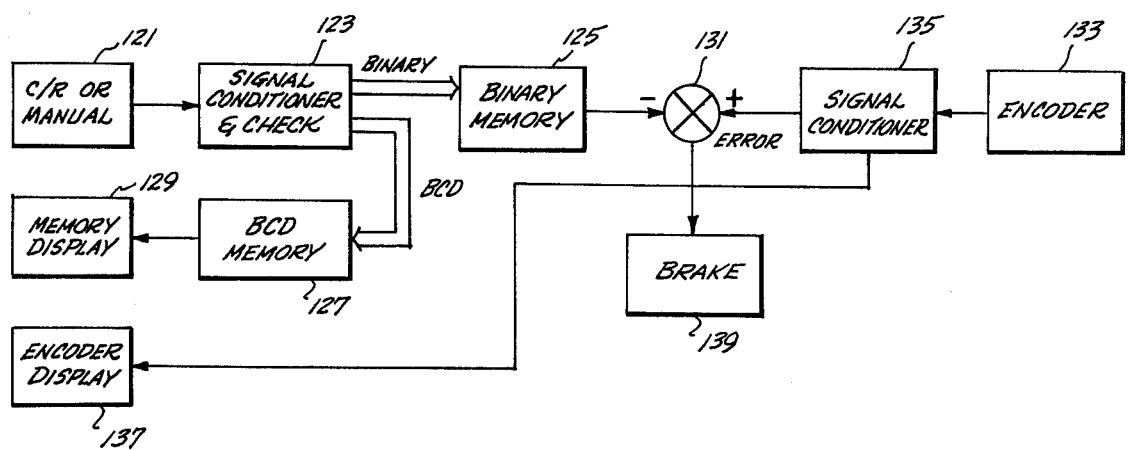
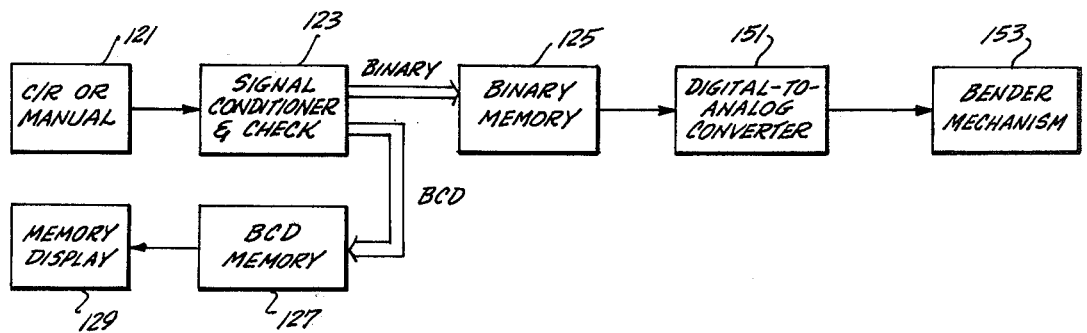

SEMIAUTOMATIC CONTROL SYSTEM FOR TUBE BENDING MACHINE

BACKGROUND OF THE INVENTION

This invention is directed to tube bending machines and, more particularly, to control systems for tube bending machines.

Originally, tubes were bent with hand-operated bending machines on a trial-and-error basis until they matched preexisting samples or layouts, or until they fit the requirements of a particular assembly of tubes. Later, measuring devices such as tapes, scales and protractors, were added to the bending machines to assist an operator in reproducing a tube configuration once its bending coordinates were established. However, such machines were found to be difficult and tedious to operate. As a result, still later, powered bending machines with systems of mechanical stops were devised. The use of mechanical stops made it possible for the operator to set-up stop points at various linear and rotational tube coordinates, in sequence. The tube was then mounted in the machine and sequentially moved to the positions defined by the stops. Such bending machines resulted in substantially identical tubes being bent in a rapid manner, once the stops were setup and verified. However, while substantially identical, the tubes were not exactly identical due to the coarseness of the stop indexing scales. The accuracy of the distance between succeeding bend tangents was usually in the order of plus or minus 1/16th to ⅛th inch and the accuracy of the rotational angle between bends was usually in the order of plus or minus ½ to 1°, depending on the size and complexity of the equipment. Moreover, the number of mechanical stops that can be set up is low; hence the number of bends that can be made without setting up a new set of stops is low.

More recently, fully automatic numerical control (NC) systems for controlling tube bending machines have been developed. Fully automatic NC systems digitally control the bending coordinates of power tube positioning systems according to a preestablished program contained on tape, punchcards or in a computer-type memory and have distance between bend accuracies of plus or minus 0.01 inch and angle between bend accuracies of plus or minus 0.1 degree.

While fully automatic NC tube bending machines have a substantial number of advantages over prior art machines using mechanical stops, they also have several disadvantages. Specifically, fully automatic NC equipment is relatively expensive, particularly when the power positioning equipment must operate over long (up to 40 feet) bed lengths. In addition, they are relatively insensitive to tube support requirements. Such support requirements are particularly critical when the last bends of a long tube are being formed, because the inertia of a long length of previously formed tube cantilevered forward of the bending head can cause the tube to be severely distorted through whipping action if the bend motion is too fast. A further disadvantage of fully automatic NC tube bending machines is the fairly large space envelope that must be evacuated by the operator once a bending cycle is initiated. The space envelope is, of course, determined by the tube gyrations that occur as a tube is being bent.

Therefore, it is an object of this invention to provide a new and improved control system for tube bending machines.

It is also an object of this invention to provide a control system for tube bending machines that is substantially lower in cost than fully automatic NC tube bending machines that include power positioning equipment, yet provides bending accuracy substantially equivalent to the bending accuracy of such machines.

It is another object of this invention to provide a semiautomatic control system for tube bending machines.

It is yet another object of this invention to provide a semiautomatic control system for tube bending machines that displays bend position data and actual tube position data such that an operator can quickly and accurately determine if a tube is appropriately positioned prior to being bent.

SUMMARY OF THE INVENTION

In accordance with this invention, a semiautomatic control system for tube bending machines is provided. The control system is semiautomatic because the operator maintains manual control over certain operations, including positioning the tube prior to each bend. The end result is a tube bending system that is less expensive than fully automatic NC equipment using powered positioning equipment, but has equivalent accuracy. Moreover, the invention can be used to retrofit mechanical stop type of tube benders in an inexpensive manner.

In its preferred form, the invention includes an operator's console that produces, and controls the storage of, bend data including: bend number, linear position, rotational position and bend angle. The bend data may be inserted manually, via a keyboard, or automatically, via a reader reading a suitable data source, such as an optical reader reading punched cards. After all of the bend data is stored, the operator's console displays the bend data for the first bend and, preferably, the final bend number. The operator then manually moves the tube, both linearly and rotationally, until the tube is suitably positioned. Suitably positioned encoders detect the position of the tube and create related linear and rotational displays. When the tube reaches the desired linear and rotational positions, linear and rotational brakes are actuated to lock the tube in position. When the brakes are locked, of course, the encoder (actual tube position) displays correspond to the related displays based on data stored in memory. Next, the operator actuates a switch that causes the tube to be bent. After the first bend is made, the bend data for the next bend is displayed and the sequence repeated. After the final bend is made, the bent tube is removed by the operator.

Preferably, the operator's console allows the operator to display, in sequence, sets of stored bend data to determine if the appropriate information is stored, without causing simultaneous bending. In addition, preferably, visual and/or audio approach warning indicators warn the operator, as he manually positions the tube, that the tube is approaching the appropriate linear and rotational positions for the next bend. And, ready indicators are lit when the appropriate positions are reached and the brakes lock.

It will be appreciated from the foregoing summary that the invention provides the accuracy advantages of fully automated, numerically controlled tube bending machines, at a considerably lower cost, primarily because powered tube positioning equipment is not included. Moreover, the invention can be utilized to retrofit existing benders, as noted above. As a result, existing tube benders of the mechanical stop variety can be modified to obtain substantial increases in accuracy and productivity over their remaining life, without a substantial capital investment. Accuracy is improved because lower accuracy mechanical stops are replaced with higher accuracy electromechanical position sensors and brakes. Moreover, setup time is substantially decreased because an operator can more rapidly enter tube bend data stored on punched cards or tape, than he can position mechanical stops. Even if bend data is manually inserted via a keyboard, setup time is substantially reduced, when compared with the time necessary to mount and/or position mechanical stops. Thus, the invention provides an inexpensive semiautomatic control system that provides accurate parts at a reduced cost per part. As discussed, parts produced on a tube bending machine including a control system formed in accordance with the invention are generally comparable in accuracy to parts produced on fully automated, numerical controlled, tube bending machines. In addition, bend capacity, when compared to mechanical stop machines, is substantially expanded. In this regard, mechanical stop machines have, in the past, been limited to making eight or so bends. The present invention expands this capacity to 30 or more bends.

The invention has the further advantage that bends near the end of relatively long (greater than 20 feet) thin walled tubes can be easily made because the operator can support the tube when such final bends are made. In this regard, as will be readily appreciated by those skilled in the art, producing bends near the end of relatively long thin walled tubes is difficult with fully automated NC machines. The present invention overcomes this disadvantage because the operator, who knows when such bends are to take place because he initiates the bend, can support the tube during the final bending action. Moreover, since the operator manually repositions the tube between bends, he has the ability to rotate the tube, as required, to clear adjacent obstructions during such positioning. In this regard, fully automated, numerically controlled tube benders, often require special clamp die motions to insure clearance of adjacent obstructions. Even when such special clamp die motions are incorporated, clearance restrictions may still require special programming. These disadvantages are overcome by the present invention. Finally, the operator normally does not have to evacuate the envelope circumscribed by the tube end during a bend sequence to the same extent he must with fully automated, numerical controlled tube bending machines, because the operator manually initiates each bend cycle. As a result, the operator is fully aware when the clamping die will close on the tube and a particular bend will be formed.

BRIEF DESCRIPTION OF THE DRAWINGS

The foregoing objects and many of the attendant advantages of this invention will become more readily appreciated as the same becomes better understood by reference to the following detailed description when taken in conjunction with the drawings, wherein:

FIG. 4 is a generalized block diagram of the main subsystems utilized to control linear and rotary position displays, and brakes adapted to lock a tube in position when the tube is appropriately positioned along linear and rotational axes;

FIG. 5 is a generalized block diagram of the main subsystems of a control system suitable for controlling bending and a related display of the angle of the bend to be formed;

DESCRIPTION OF THE PREFERRED EMBODIMENT

Figure 1:
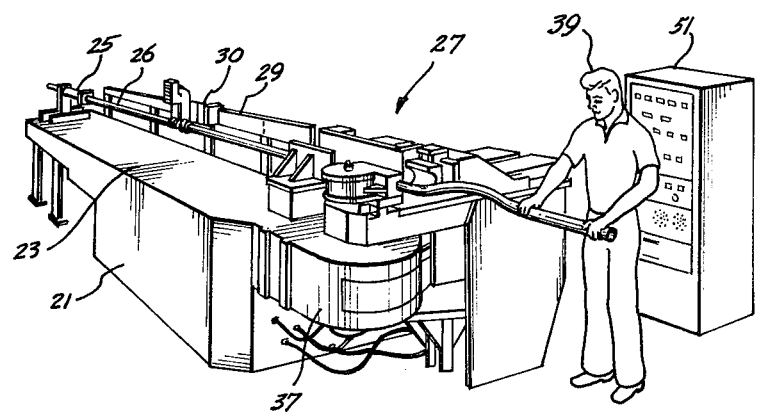
FIG. 1 is a pictorial diagram of a tube bending machine suitable for control by a control system formed in accordance with the invention.

FIG. 1 is a pictorial diagram of a powered tube bending machine modified in accordance with the invention. Since powered tube bending machines of the type generally illustrated in FIG. 1, but using mechanical stops, are well known in the art, only a brief description of the main components of a powered tube bending machine is set forth. In this regard, a powered tube bending machine normally includes a frame 21 that supports an elongate bed 23 lying in a horizontal plane. Located at one end of the elongate bed 23 is a mandrel support 25. Located at the other end of the elongate bed is a tube bender assembly 27. A mandrel rod 26 extends from the mandrel support 25, above the bed 23, toward the tube bender assembly 27.

Figure 2:
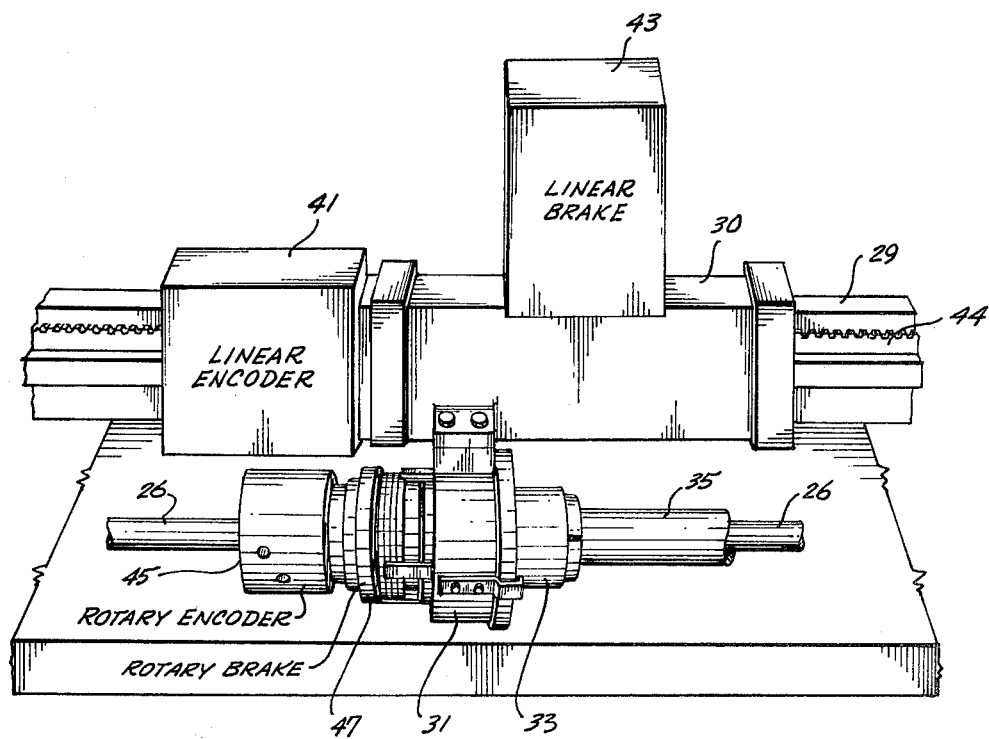
FIG. 2 is an enlarged, simplified view of a linear brake, linear encoder, rotary encoder and rotary brake mechanism, forming a portion of the invention and suitable for mounting on the tube bending machine illustrated in FIG. 1.

Located along one side of the elongate bed 23, parallel to the mandrel rod 26, is a horizontal support bar 29. As best seen in FIG. 2, mounted on the horizontal support bar 29 is a support housing 30. A support bracket 31 is attached to the support housing 30 and slidably mounted on the mandrel rod 26 in a manner such that the support bracket provides support for the mandrel. Located on the end of the support bracket 31 facing the tube bender assembly 27, about the mandrel rod 26, is a collet 33. The collet 33 is adapted to attach to one end of a tube 35 slid down the mandrel rod 26 from the tube bender assembly end of the mandrel. The tube 35 is, thus, attached to one end to the collet and extends from the support bracket 31 toward, and through, the tube bender assembly 27.

As is well known in the art, the tube bender assembly 27 includes a clamping die, a pressure die and a bend die. The bend die is rotated by a suitable hydraulic or pneumatic tube bender mechanism 37 mounted beneath the elongate bed 23 at the location of the tube bender assembly 27.

An example of a tube bender of the type with which the present invention is useful is the model 1½ Dial-A-Bend Machine produced by the Teledyne-Pines Company of Aurora, Ill.

In the past, a tube has been manually positioned by an operator 39. After being positioned, the operator has actuated the tube bender hydraulic or pneumatic mechanism 37 to create the desired tube bend. Positioning has been accomplished using mechanical stops. Linear mechanical stops have been used to control the position of the support housing 30 along the horizontal support 29. rotational mechanical stops have been used to control the position of the collet 33 angularly about the mandrel rod 26. As discussed above, there are two primary disadvantages to use of mechanical stops. First, the accuracy of bend is substantially less than desirable in many circumstances. Second, positioning the mechanical stops is a tedious and time consuming task. Third, the number of mechanical stops that can be mounted at one time is limited. As a result, productivity is substantially lower than desired. The invention overcomes these disadvantages, and other disadvantages of mechanical stop type tube bending machines by providing a system, that allows an operator 39 to rapidly and quickly position a tube between bends. This result is accomplished at a substantially lower cost than is involved in providing a fully automated numerically controlled (N/C) tube bending machine. Yet, the accuracy of tube bends is equivalent to that obtainable using fully automated N/C benders.

In accordance with the invention, the tube bending machine is modified by mounting a linear encoder 41 on the support housing 30. Also mounted on the support housing 30 is an electromechanical linear brake 43. The linear encoder 41 and linear brake 43 coact with a toothed elongate rack 44 mounted on the horizontal support 29. Mounted adjacent to the collet about the mandrel 26 are a rotary encoder 45, and an electromechanical rotary brake 47. In a conventional manner, the linear encoder 41 senses linear movement of the support bracket 31 (and, thus, the tube 35) along the horizontal support bar 29. The linear brake, when activated by a suitable electrical signal, locks the support bracket 31 (and, thus, the tube) in a fixed position along the longitudinal length of the horizontal support bar 29. Similarly, the rotary encoder produces a signal that identifies the rotational position of the collet 33 with respect to a fixed reference point; and, the rotary brake locks the rotary collet in place when the rotary brake is energized by a suitable electrical signal. In this manner, the linear and rotational positions of the tube are sensed and the tube is susceptible to being locked in any desired linear or rotational position. Since linear and rotary encoders and brakes are well known electromechanical devices, they are only illustrated in general block/schematic form in FIG. 2 and will not be described in detail.

Figure 3:
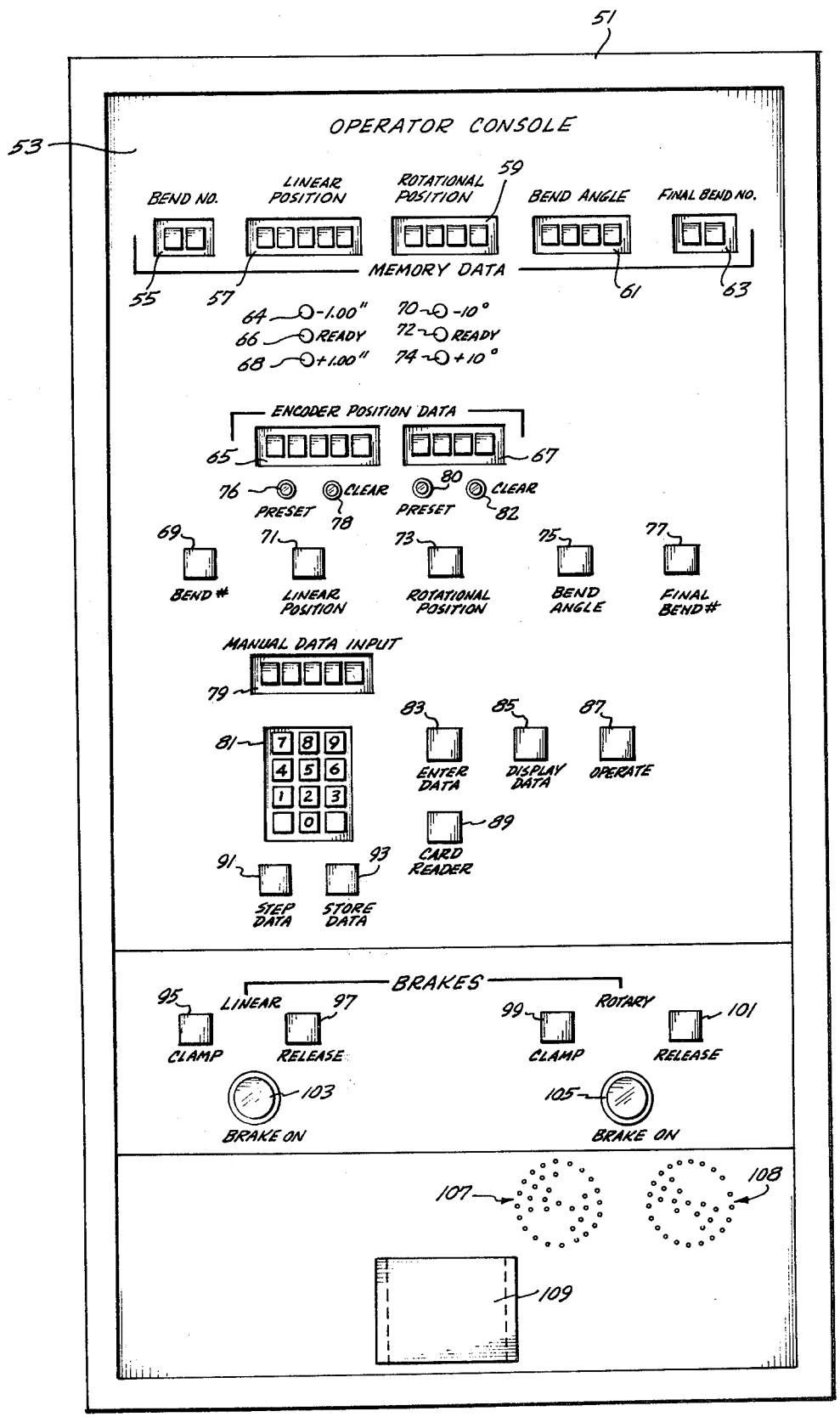
FIG. 3 is a pictorial view of an operator's console used to input data and display information in accordance with the invention.

Also forming part of the present invention, and illustrated in FIG. 1, is a control console 51. The front panel 53 of the control console 51 is illustrated in FIG. 3 and includes a number of switches and displays. As will be readily recognized by those skilled in the art and others, the displays and switches can be positioned at any suitable position on the front panel. Thus, the following descriptive layout should be construed as exemplary, not limiting.

Located in a row across the top of the front panel 53 is a group of memory data displays. The memory data displays include, moving from left to right: a two-digit bend number display 55; a five-digit linear position display 57; a four digit rotational position display 59; a four-digit bend angle display 61; and a two-digit final bend number display 63. Located beneath the memory data displays is a second row of displays comprising two displays. These displays are the encoder position data displays and include: a five-digit linear position display 65 located beneath the memory linear position display 57; and, a four-digit rotational position display 67 located beneath the memory rotational position display 59.

Located between the memory linear position display 57 and the encoder linear position display 65 is a column of three lights. The upper light 64 is denoted −1.00 inches, the middle light 66 is denoted "ready" and the lower light 68 is denoted +1.00 inches. Preferably, the upper and lower lights 64 and 68 are of one color and the middle light 66 is of another color. Similarly, located between the memory rotational position display 59 and encoder rotational display 67 is a column of three lights. The upper light 70 is denoted −10°, the middle light 72 is denoted "ready" and the lower light 74 is denoted +10°. Again, preferably, the upper and lower lights are of one color and the middle light is of another color. As will be better understood from the following discussion, the −1.00, +1.00, −10° and +10° lights warn the operator when the tube he is longitudinally and rotationally moving is approaching the correct position. When the correct position is reached the brakes lock and the ready lights are lit.

Located beneath the linear encoder display 65 are a pair of switches 76, 78 designated preset and clear. Similarly, located beneath the rotary encoder display 67 are a pair of switches 80, 82 designated preset and clear. As will be better understood from the following discussion, the preset switches are adapted to preset a related counter such that the display for the related encoder display displays a preset value and the clear switches are adapted to clear the counters and, thus, the displays. Located beneath the two pairs of preset and clear switches is a row of five pushbutton switches. The first switch 69 is denoted bend number; the second switch 71 is linear position; the third switch 73 is denoted rotational position; the fourth switch 75 is denoted bend angle; and, the fifth switch 77 is denoted final bend number. These five switches are located at positions beneath related displays of the memory data displays.

Located beneath the row of five pushbutton switches 69, 71, 73, 75 and 77 is a single five-digit display 79 denoted manual data input. This display displays information inserted manually via a keyboard 81 located immediately below the manual data input display 79. The keyboard 81 is a conventional 3 x 4, 12 button keyboard, with only ten (designated 0–9) of the buttons being utilized to enter data. In a conventional manner, each time a particular numbered button is depressed, a code relating to the number of that button is produced.

Located on the right side of the keyboard is a row of three pushbutton switches. The first switch 83 of this row is denoted enter data, the second switch 85 is denoted display data and the third switch 87 is denoted operate. Located beneath the enter data switch 83 is a further pushbutton switch 89 denoted card reader. Located beneath the keyboard 81 is a further pair of pushbutton switches. The first of these switches 91 is denoted step data and the second switch 93 is denoted store data. Located beneath the stop and store data switches 91 and 93 is a row of four switches, two on the right and two on the left. The leftmost first pair of switches are related to the linear brake. The first of these switches 95 is denoted clamp and the other switch 97 is denoted release. The rightmost pair of switches are related to the rotary brake. The first of these switches 99 is denoted clamp and the other switch 101 denoted release. Located beneath the clamp and release linear brake switches 95 and 97 is an indicating light 103 denoted brake on. Located beneath the clamp and release rotary brake switches 99 and 101 is an indicating light 105 denoted brake on. The brake on indicating lights are lit when the related brakes are on, either as a result of the actuation of the related clamp switch or as a result of the automatic brake action hereinafter described. Located beneath the rotary brake on light is a pair of speakers 107 and 108. Finally located in the center of the console 53, generally beneath the speakers 107 and 108, is a card reader 109.

As will be readily appreciated by those skilled in the art, the operator console illustrated in FIG. 3 forms the man/machine interface between the operator 39 and the control system of the invention, illustrated in FIGS. 6-14 and hereinafter described. In essence, the operator's console includes a plurality of displays that display information useful to the operator. These displays include the bend data stored in memory and the encoder data related to the actual position of the tube. Finally, manually inserted data is displayed for verification purposes prior to being entered in memory. The operator console also includes control switches that allow the operator to enter data and control the operation of the control system, as will be better understood from the following description. Finally, the operator console includes devices (audio and visual) designed to warn the operator when the tube he is manipulating is approaching a position at which the brakes will lock.

As will be better understood from the following description, initially, an operator inserts information into the machine either by operating the keyboard 81 or by inserting cards in the card reader 109. This information is verified and, then, stored. After all of the necessary bend data has been stored in suitable memory bins, a tube is slid on the mandrel rod 26 and one end is clamped by the collet 33. At the same time, the first set of bend data stored in memory is displayed. At this point, the brakes are released, or the operator releases them by actuating the release switches. The operator then manually moves the tube, linearly and rotationally, until the tube reaches the first bend position. When the desired rotational and linear positions are reached, the brakes are automatically actuated and lock tube in position. Thereafter, the operator actuates a switch which causes the tube to be clamped in position, the linear brake to be released and the tube to be bent. This sequence is then repeated for the second bend.

FIG. 4 is a generalized block diagram that illustrates the subsystems utilized to control linear or rotational positioning and FIG. 5 is a generalized block diagram that illustrates the subsystem utilized to control bend angle. These generalized subsystem diagrams are intended to assist in the understanding of the overall control system illustrated in FIGS. 6-14 and hereinafter described.

FIG. 4 includes a card reader (C/R) or manual data input source 121 connected to the input of a signal conditioner and check circuit 123. The signal conditioner and check circuit 123 conditions the incoming data, verifies that it is within range (e.g., that the data does not require that the tube be moved to a negative linear position or rotated through more than 360°) and converts the data into binary and binary coded decimal (BCD) forms. The binary data is applied to and stored in a binary memory 125. The BCD data is applied to and stored in a BCD memory 127. The BCD memory is connected to a related memory display 129. The output of the binary memory is connected connected to a related memory display 129. The output of the binary memory is connected to a summer or comparator 131. The output of the encoder (rotational or linear) 133 is connected to the input of a signal conditioner 135.

The output of the signal conditioner 135 is applied to the other input of the summer 131. The output of the signal conditioner is also applied to an encoder display 137. The output of the summer, which is an error signal, is applied to a brake 139 (linear or rotational). In operation, the bend position data stored in the binary memory 125 is compared with the encoder position data. When the encoder data and the memory data are identical, but opposite in sign, the error voltage becomes zero. When this condition is reached, the brake 139 is energized. The memory display displays the stored data corresponding to the binary data compared with the encoder data; and, the encoder display displays actual tube position.

FIG. 5 also includes the card reader or manual data source 121, the signal conditioner and checker 123, the binary memory 125, the BCD memory 127 and the memory display 129. These subsystems all function in the same manner, except in this case, the data received, verified and stored relates to bend angles. That is, bend angle data produced by the C/R, or keyboard is conditioned, checked and converted into binary and BCD form. The check determines whether or not the requested bend angle lies within the operational parameters of the bend mechanism. The binary memory data is applied to a digital-to-analog converter 151. The thusly developed analog data controls the bender mechanism 153. In this manner, bend angle data is received, stored and used to control display and tube bending.

As will be readily appreciated, FIGS. 4 and 5 are simplified block diagrams of the overall system operation. Obviously, many controls and other functions are necessary to provide a complete system. In this regard, FIG. 6 discloses a preferred embodiment of a semiautomatic control system for a tube bending machine formed in accordance with the invention. FIGS. 7-14 illustrate, in block form, details of the preferred form of the various subsystems used to form the control system illustrated in FIG. 6.

Figure 6:
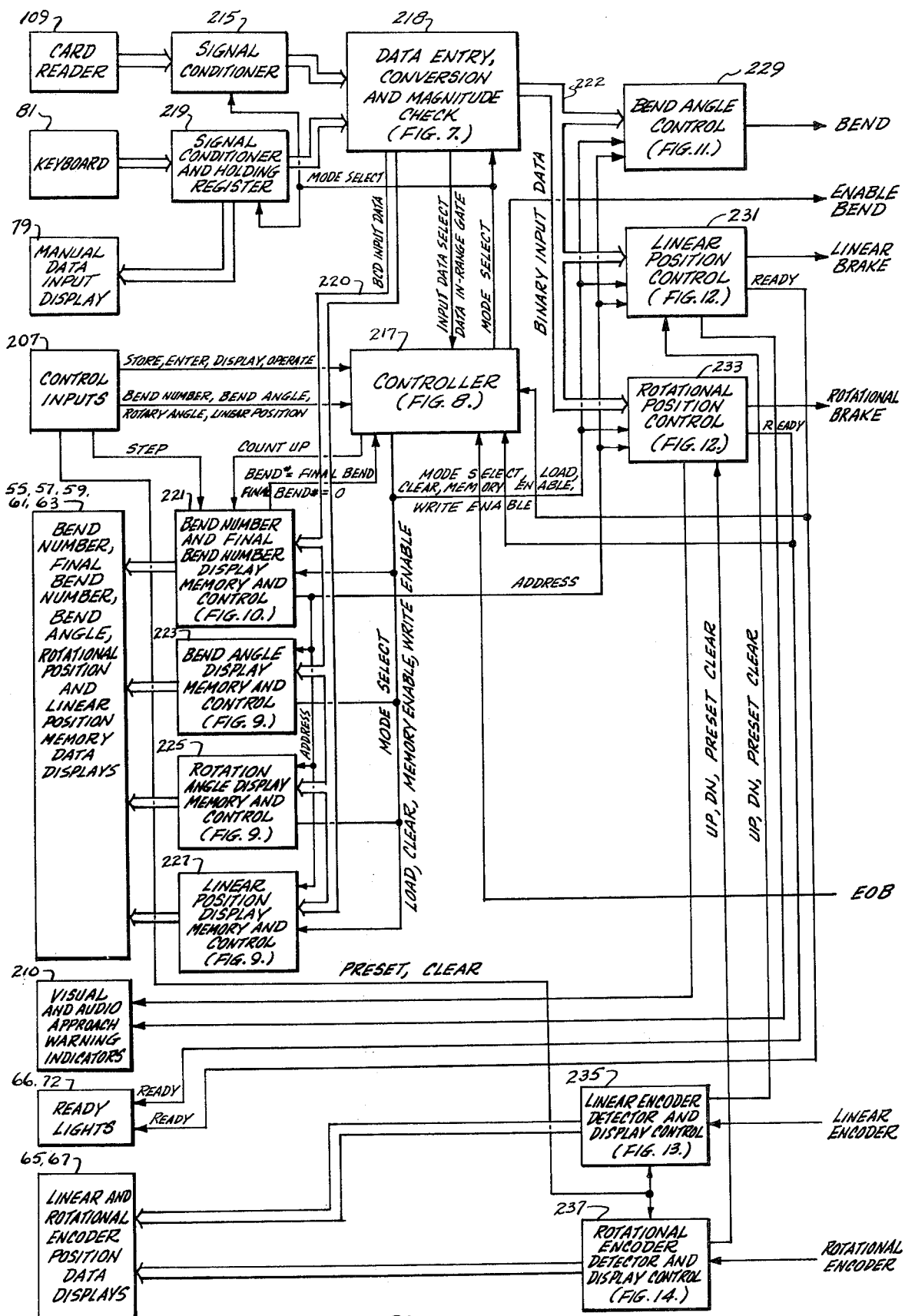
FIG. 6 is a more detailed block diagram of a control system formed in accordance with the invention.

FIG. 6 illustrates, on the left, in block form, the various displays and control inputs of the operator console illustrated in FIG. 3 and heretofore described. In this regard, included in FIG. 6 is the card reader 109, the keyboard 81, the manual data input display 79, control inputs (e.g., the various control switches) 207, the memory data display 55, 57, 59, 61 and 63, visual and audio approach warning indicators (+1.00, − 1.00, +10°, —10° and speakers) 210, the ready lights 66, 72, and the encoder position data displays 65 and 67.

The data output of the card reader 109 is applied to a signal conditioner 215. The signal conditioner is enabled an by an appropriate MODE SELECT signal produced by a controller 217 in the manner hereinafter described. The data output of the signal conditioner 215 is applied to a data input of a data entry, conversion and magnitude check subsystem 218, preferably formed in the manner illustrated in FIG. 7 and hereinafter described.

The data output of the keyboard 81 is applied to a signal conditioner and holding register 219. The signal conditioner and holding register is also enabled by an appropriate MODE SELECT signal produced by the controller 217. The signal conditioner and holding register 219 has two data outputs. One data output of the signal conditioner is applied to a second data input of the data entry, conversion and magnitude check subsystem 218. The other data output of the signal conditioner and holding register is applied to the manual data input display 79. The signal conditioner and holding register 219 receives keyboard data and conditions the data so that it is suitable for application to the manual data input display 79 and the data entry, conversion and magnitude check subsystem 218. The signal conditioner and holding register also includes a holding register that holds the incoming data while the operator verifies the accuracy of his input by viewing the manual input data display. Subsequent to such verification, a LOAD signal produced by the controller 217 as a result of the operators actuation of a selected one of the bend number, linear position, rotational position, bend angle or final bend number switches 69, 71, 73, 75 and 77 causes the data to be applied to the data entry, conversion and magnitude check subsystem.

The data entry, conversion and magnitude check subsystem produces two types of data related to the input data, regardless of whether the input data is received from the card reader or from the manual data input. The two types of data are binary coded decimal (BCD) input data and binary input data. The BCD input data is applied to a related one of several display memory and control subsystems. More specifically, the BCD input data produced by the data entry, conversion and magnitude check subsystem 218 is in parallel form and is applied to a BCD bus 220. The BCD bus 220 runs to: a bend number and final bend display memory and control 221; a bend angle display memory and control 223; a rotational position display memory and control 225; and, a linear position display memory and control 227. The controller 217 applies control signals entitled MODE SELECT, LOAD, CLEAR, MEMORY ENABLE and WRITE ENABLE, to: the bend number and final bend number display memory and control 221; the bend angle display memory and control 223; the rotational position display memory and control 225; and the linear position memory and control 227. Further, the bend number and final bend number display memory and control 221 produces ADDRESS signals related to a particular bend number as hereinafter described in more detail. The ADDRESS signals are applied to the bend angle display memory and control 223, the rotational position display memory and control 225 and the linear position display memory and control 227. The ADDRESS, MODE SELECT, LOAD, CLEAR, MEMORY ENABLE and WRITE ENABLE signals are also applied to other subsystems as hereinafter discribed.

The LOAD and CLEAR signals control temporary storage devices (e.g., registers) forming part of the bend number and final bend number display memory and control 221, the bend angle display memory and control 223, the rotational position display memory and control 225 and the linear position display memory and control 227. The LOAD signals are "hard wired" to their related temporary storage registers so that each of these subsystems is responsive to a different LOAD signal. Thus, when a LOAD signal is produced, the information contained on the BCD input data bus 220 is loaded into the temporary storage register of the related subsystem. The CLEAR signal is common to all temporary storage registers. The temporary storage arrangement is only of significance when manual data is being inserted since it provides for the temporary storage of information for accuracy and verification review by the operator prior to the data being stored in memory.

The WRITE ENABLE and MEMORY ENABLE signals control writing into and readout from the memories forming a part of the bend number and final bend number display memory and control 221, the bend angle display memory and control 223, the rotational position display memory and control 225 and the linear position display memory and control 227. The WRITE ENABLE signal enables these memories to read data stored in their related temporary storage registers and the MEMORY ENABLE signal enables the read-out of data at the data output lines of the memory. Preferably the MEMORY ENABLE and WRITE ENABLE signals are common to all memories. The ADDRESS signal produced by the bend number and final bend number display memory and control, controls the addresses of the data bins at which data is stored in, and read from, the memories at any particular point in the sequence of operation.

The controller 217 also applies a signal denoted COUNT UP to the bend number and final bend number display memory and control 221. The COUNT UP signals are pulses that cause a counter in the bend number and final bend number display memory and control to step to the next address of a stored set of bend data in sequence, starting from the first bend and running through the final bend. The resultant ADDRESS signals cause the memories to apply the data stored at the related memory addresses to their respective outputs. A STEP signal produced by the actuation of the step data switch 91 located on the operator console 53 functions in essentially the same way as will be better understood from the following discussion of FIG. 10.

The binary input data output of the data entry, conversion and magnitude check subsystem 218 is applied via a binary data bus 222 to: a bend angle control 229; a linear position control 231; and, a rotational position control 233. The bend angle control, linear position control and rotational position control also receive the ADDRESS signals produced by the bend number and final bend number display memory and control 221. In addition, the bend angle control, the linear position control and the rotational position control receive the MODE SELECT, LOAD, CLEAR, MEMORY ENABLE and WRITE ENABLE signals produced by the controller 217. The bend angle control, linear position control and rotational position control all include temporary storage registers and memories that receive and store binary input data. As with the related BCD display memory and control subsystems, the LOAD and CLEAR signals control the temporary storage registers and the WRITE ENABLE, MEMORY ENABLE and ADDRESS signals control the permanent memories. The linear position control and the rotational position control control the linear and rotational brakes, respectively. More specifically, when the operator manually moves the part to the desired position, the linear and rotational brakes are actuated by actuating signals produced by the linear and rotational position controls, respectively. The actuating signals are produced when the position being read out of memory is the same as the position sensed by the related encoder, as heretofor described. The bend angle control controls tube bending subsequent to the brakes locking, when the operator actuates a tube bender cycle forward (bend actuate) switch located on the bend machine.

The output of the linear encoder 41 is applied to a linear encoder detector and display control 235 and the output of the rotary encoder 45 is applied to a rotational encoder detector and display control 237. The linear encoder detector and display control 235 and the rotational encoder detector and display control 237 also receive preset and clear signals produced in accordance with the actuation of the related preset and clear switches located on the operator console and previously described. The linear encoder detector and display control produces a series of output control signal designated UP, DN, PRESET and CLEAR, which are applied to the linear position control 231. Similarly, the rotational encoder detector and display control 237 produces a series of output control signals designated UP, DN, PRESET and CLEAR, which are applied to the rotational position control 233. These control signals control the state of binary counters forming a portion of the linear and rotational position controls. The linear and rotational position controls compare the counter signals with the binary input data stored in memory at the address denoted by the ADDRESS signal. When a comparison occurs, the related linear or rotational brake is actuated. In addition, the linear encoder detector and display control 235 and the rotational encoder detector and display control 237 produce BCD display control signals that are applied to the linear and rotational encoder displays 65, 67. As a result, these displays display the actual position of the tube, as determined by the linear and rotational encoders.

The linear position control and rotational position control also produce ready signals that are applied to the ready lights 66, 72, when the linear and rotational brakes respectively, are activated. Moreover, the linear position control and rotation position control produce control signals that are applied to the visual and audio approach warning indicators 210, causing these indicators to become activated when the desired linear and rotational tube positions are being approached. In this manner, the operator is warned when the tube is approaching the position whereat the linear and rotational brakes are to be activated. These warnings are designed to assist the operator in manual tube positioning such that overshoot is avoided.

In summary, the input data produced by either the card reader 109 or the keyboard 81 is conditioned and checked to determine whether or not the magnitude values represented by the input data are within operational parameters (e.g., are in range). If the data is in range, it causes related BCD input data and binary input data to be produced on the related buses. The BCD input data is stored and used to control displays. The displays include a bend number display, a final bend number display, a bend angle display, a rotational position display and a linear position display. The binary input data is also stored; and, used to control the linear and rotational brakes, and bending of the tube. The controller interprets the control inputs (e.g., switch actuations) and, in accordance therewith, controls whether or not data is being stored or being utilized. The controller also controls the clearing of the temporary storage registers used to store data prior to its being transferred to a memory.

In addition, visual and audio approach warning indicators are activated when the manual movement of the tube approaches the positions whereat the linear and rotational brakes are to be actuated. And, when the brakes are actuated, the operator is advised, via the ready lights, that the appropriate position has been achieved, and the brakes locked. The desired position is achieved when the linear and rotational position controls determine that the data received from the linear and rotary encoders is the same as the binary input data being read out of memory. The linear and rotational encoder displays display the actual position of the tube. Of course, when the brakes lock, the encoder linear and rotational position displays should be identical to the memory linear and rotational position displays.

After the brakes are locked and the ready lights lit, the operator actuates the machine cycle forward switch and the bend is made. When the bend is complete, the bender mechanism produces an end of bend (EOB) signal that flows to the controller 217. In accordance therewith, the controller causes a COUNT UP pulse to occur and the data related to the next bend appears on the memory displays. At the same time the outputs of the memories of the linear and rotational position controls 231 and 233 change and the rotary brake is released. (The linear brake is released prior to bending when the clamp die is actuated in order to allow the tube to move forward during bending.) The operator then moves the tube until the brakes again lock, and the encoder and memory displays are the same.

Turning now to a discussion of subsystems suitable for use in the system illustrated in FIG. 6. In this regard, since suitable signal conditioners, with or without holding registers are known items that can take on various forms, only a general description of their operation is presented. In this regard, when enabled by a suitable MODE SELECT signal, the signal conditioner 215 merely places the card reader data in a form suitable for receipt by the data entry, conversion and magnitude check subsystem 218. In a similar manner, upon receipt of an enabling MODE SELECT signal, the signal conditioner and holding register 219 places the keyboard data in a form suitable for receipt by the data entry conversion and magnitude check subsystem 218. In addition to conditioning the signal, the holding register portion of this subsystem holds the received data for review by the operator, via the manual data input display 79. In the described embodiment of the invention, the data output of both the signal conditioner 215 and the signal conditioner and holding register 219 are assumed to be in binary coded decimal (BCD) form; however, it is to be understood that this data could take on other forms, if desired.

It is pointed out here that the MODE SELECT signals that select the various subsystems, while illustrated as flowing along a single common conductor for purposes of simplicity, are in reality either a coded set of signals each of which is decoded and recognized only by the subsystems to which a particular code relates, or the common wire represents a set of wires each of which is connected to a particular subsystem. In this regard, since device for producing coded mode select signals and for detecting a particular code at a particular subsystem are known in the art, they are not illustrated in the drawings. Similarly, since "hard wired" mode select signal type arrangements are known, individual wires are not illustrated, because of the resulting drawing confusion that might occur.

Figure 7:
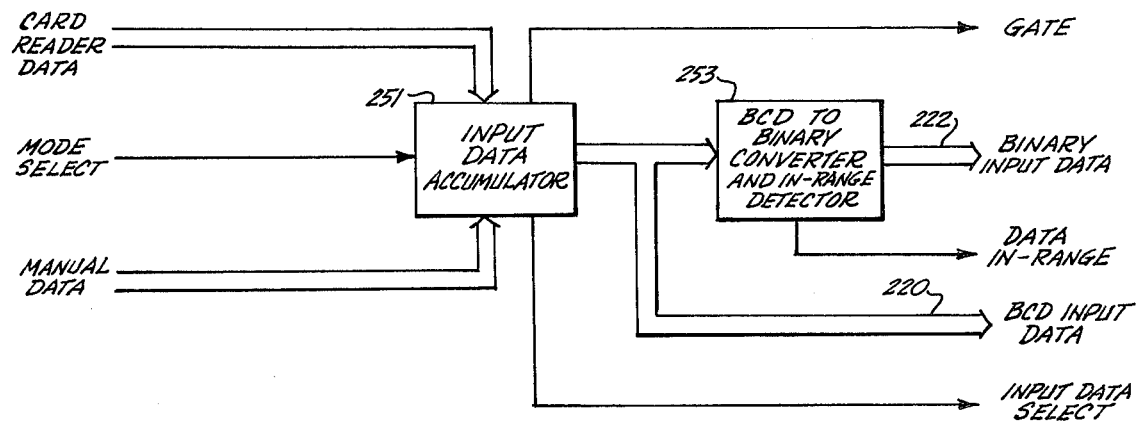
FIG. 7 is a block diagram of a data entry, conversion and magnitude check subsystem suitable for use in the control system illustrated in FIG. 6.

FIG. 7 illustrates a data entry, conversion and magnitude check subsystem and comprises: a data input accumulator 251; and, a BCD to binary converter and in-range detector 253. The data input accumulator 251 includes two data inputs, one connected to the signal conditioner 215 for receiving card reader data and the other connected to the signal conditioner and holding register 219 for receiving keyboard data. In addition, the data accumulator 251 includes a control input that receives a MODE SELECT signal. The MODE SELECT signal determines whether the input data accumulator is enabled to receive data and, if enabled, which of its data inputs is enabled. Thus, the input data accumulator can be disabled, or enabled to receive either card data or keyboard data. The input data accumulator, in addition to including a data storage device for accumulating (storing) the data it is conditioned to receive, also includes detectors for detecting when the storage device has received a full complement of data and, if the data is card reader data the type of data that has been received. In this regard, when the storage device has received a full complement of data from the card reader, a signal designated GATE shifts states to indicate that a full complement of card reader data is available for readout. A signal designated INPUT DATA SELECT indicates the type of data available when the received data is from the card reader. That is, the input data select output of the input data accumulator is enabled when the MODE SELECT signal enables the receipt of card reader data. The nature of the INPUT DATA SELECT signal denotes the kind of data, i.e., bend number, bend angle, rotational position, linear position or final bend number actually received and temporarily stored in the input data accumulator. The GATE and INPUT DATA SELECT signals are inoperative in the manual or keyboard data receiving mode of operation.

The BCD to binary converter and in-range detector is connected to the output of the input data accumulator 251 and receives the data temporarily stored in the input data accumulator 251. The BCD to binary converter and in-range detector converts the BCD data into binary data and determines whether or not the data is within a suitable range of values. That is, the BCD to binary converter and in-range detector 253 includes level detectors that determine whether or not the received data is in range. For example, if data related to the linear position of the tube requires that the tube be moved to a physically impossible position, the data is considered to be "out of range". Similarly, if the received data requires a bend of more than an allowable amount, the bend angle data may be considered "out of range".

As long as the received data is determined to be in range a signal designated DATA IN RANGE is maintained in an appropriate state, i.e., high or low, depending upon the specific operation of the overall system. When this signal is placed in the opposite state it, denotes that the received data is out of range.

The BCD to binary converter and in-range detector also has a binary input data output. The binary input data is the data applied to binary input data bus 222 (FIG. 6), previously described. Similarily, the BCD input data output of the input data accumulator 215 is applied to the BCD input data bus 220, also previously described.

Figure 8:
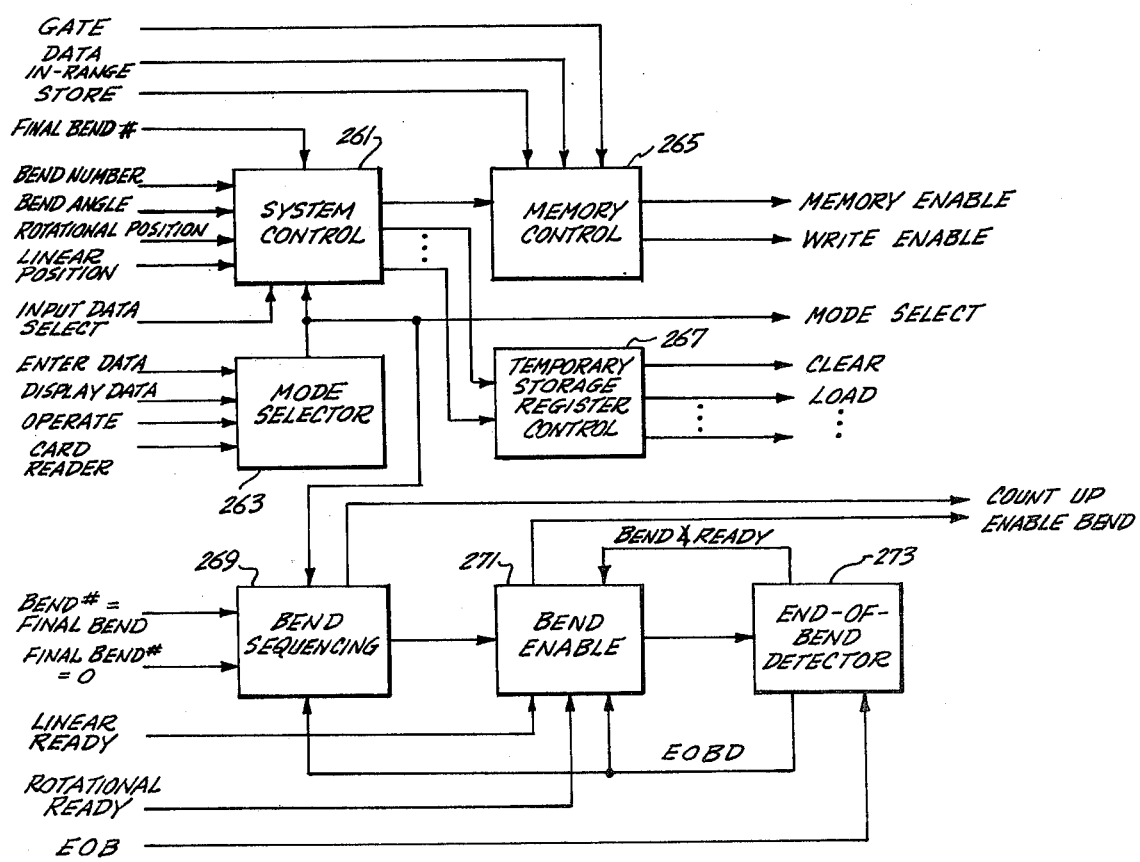
FIG. 8 is a block diagram of a controller suitable for use in the control system illustrated in FIG. 6.

FIG. 8 is a block diagram of a controller suitable for use in the control system illustrated in FIG. 6 and comprises: a system control 261; a mode selector 263; a memory control 265; a temporary storage register control 267; a bend sequencing circuit 269; a bend enable circuit 271; and, an end-of-bend detector 273.

The system control 261 is connected to receive control signals whose nature is determined by the actuation of the bend number 69, linear position 71, rotational position 73, bend angle 75, and final bend number 77 switches located on the operator console 53. The system control also receives the INPUT DATA SELECT signal produced by the input data accumulator 251. In this manner, the system control receives information about the type of data being received during data entry. In the case of keyboard data, the type is determined by the actuation of one of the data identifying switches. In the case of card reader data, the type is denoted by the nature of the INPUT DATA SELECT signal, as previously discussed. The mode selector 263 is connected to receive control signals whose nature is determined by the actuation of the enter data 83, display data 85, operate 87, and card reader 89 switches located on the operator console 53. In accordance with the actuation of these switches, the mode selector produces either a MODE SELECT signal on a separate conductor hard wired to a specific subsystem, or a coded MODE SELECT signal. The MODE SELECT signals are applied to the system control, the bend sequencing circuit 269 and other subsystems, as herein described.

The system control 261 produces control signals that are applied to the temporary storage register control 267 and to the memory control 265. The nature of these control signals is, of course, determined by the nature of the various data inputs of the system control. The control signals determine which of the various temporary storage registers connected to the BCD input data and the binary input data buses 220 and 222 are to be enabled when data is available, in accordance with the actuation of one of the bend number, bend angle, rotational position, linear position or final bend number switches. For example, if the operator is manually entering bend number data via the keyboard, after inserting the data and determining via the manual data input display 79 that the correct number has been inserted, the operator actuates the bend number switch 69, which identifies the data as bend number data. (Prior thereto, the operator would have actuated the enter data switch, which causes the mode selector to advise the timing control that data is forthcoming by producing a suitable MODE SELECT signal.) Bend angle, rotational angle and linear position data related to this bend number is then entered, verified by the operator and the data entry, conversion and magnitude check, and stored in BCD form in the temporary storage registers of the bend angle, rotational angle and linear position memories and controls 223, 225 and 227, respectively. The bend angle, linear position and rotational position data is simultaneously stored in temporary storage registers of the bend angle, linear position and rotational position controls 229, 231 and 233, respectively. After the data is stored in the temporary storage registers, it can be displayed for further operator verification by the operator actuating the display data switch 85. When the operator is satisfied that the data is ready for storage he actuates the store data switch 93, which enables the memory control 265 to shift the data to memory.

A similar sequence of steps occurs when data is received from the card reader, except the sequence is automatic. More specifically, card reader data is automatically shifted to permanent memory by the GATE signal (unless found to be out of range). The GATE signal achieves an appropriate state when card reader data is being received. This state enables the memory control, whereby data is automatically transferred from the temporary storage registers to the permanent memories. Of course, the INPUT DATA SELECT signal via the system control and the temporary storage register controls which temporary storage register receives a particular complement of data. In this way, bend angle data is applied to the bend angle display memory and control 223 and to the bend angle control 229, for example.

The bend sequencing circuit 269, in addition to receiving an appropriate MODE SELECT signal, also receives a signal from the bend number and final bend number display memory and control 221 indicating when the final bend number is zero, i.e., no final bend number is being displayed and another signal indicating when the bend number being displayed is equal to the final bend number. The bend enable circuit 271 is connected to the bend sequencing circuit 269 so as to be enabled when the bend sequencing circuit determines that bends can take place. In this regard, when the final bend number is found to be equal to zero, the bend enable circuit 271 is disabled. Similarly, immediately after the final bend is made, the bend enable circuit 271 is disabled. In between these two extremes, the bend sequencing circuit 269 applies an enable signal to the bend enable circuit 271 after the operate switch 87 is actuated. This enable signal is present until bending is complete. The bend sequencing circuit 269 also receives an end-to-bend (EOBD) signal from the end-of-bend detector 273 and produces an output signal denoted COUNT UP. An EOBD signal occurs each time a bend is completed. The EOBD signal causes a corresponding COUNT UP pulse, which is applied to the bend number and final bend number display memory and control, as herein described.

In addition to receiving an enable signal from the bend sequencing circuit 269, the bend enable circuit 271 also receives the ready signals produced by the linear position control 231 and the rotational position control 233. These signals are designated LINEAR READY and ROTATIONAL READY in FIG. 8. The bend enable circuit 270 also receives the EOBD signal. Finally, the bend enable circuit 271 receives a BEND ANGLE READY signal produced by the end-of-bend detector. The bend enable circuit 271 produces an ENABLE BEND signal when all of its inputs are in enabling states.

The end-of-bend detector 273 receives the EOB signal produced by the bending machine. In accordance therewith, the end-of-bend detector produces the EOBD signal applied to the bend sequencing circuit 269. Further, after a predetermined time delay adequate for bend angle data to be made available to the bender, the end-of-bend detector produces the BEND ANGLE READY signal applied to the bend enable circuit 271.

In operation, the operator actuates the operate switch 87, causing a MODE SELECT signal that enables the bend sequencing circuit to produce an enable signal. Assuming the final bend number is not equal to zero and the bend number is not greater than the final bend number, the bend sequencing circuit enables the bend enable circuit. The bend enable circuit is enabled if the linear and rotational ready signals are in enable states as a result of the brakes being locked; and, the bend angle ready signal is in an enabling state because the time delay has elapsed. During bending, the bend enable circuit enables the end-of-bend detector so that is it conditioned to receive an EOB signal. When the EOB signal is received, the enable bend signal terminates because the resulting EOBD signal causes the bend enable circuit to be disabled. The EOB signal received from the bend mechanism also causes the bend angle ready signal to temporarily be placed in disabling state. After a suitable delay, the bend angle ready signal returns to an enabling state. The linear and rotational ready signals are placed in enabling states as soon as the part is repositioned and the linear and rotary brakes lock. In essence, the bend enable circuit is an AND function gate that produces an enabling signal only when all of its inputs are in appropriate states, such as when they are all in binary one states, for example. When the ENABLE BEND signal is produced, the bending mechanism is conditioned such that the operators actuation of a tube bender cycle forward switch causes the bend to be made. The next EOBD signal after the bend number equals the final bend number signal occurs causes the bend sequencing circuit to disable the bend enable circuit.

Figure 9:
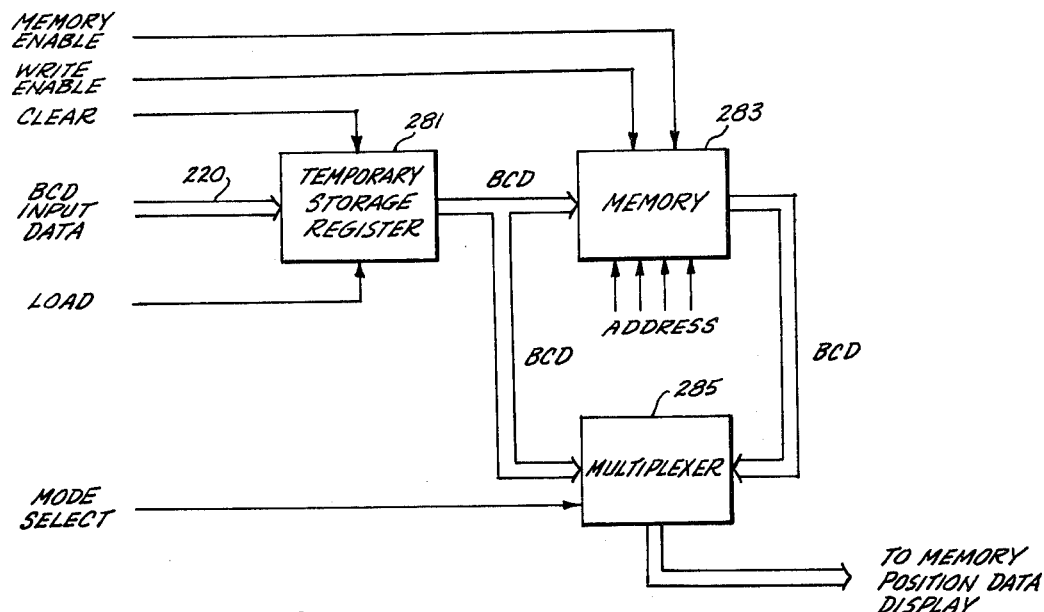
FIG. 9 is an exemplary diagram of a bend angle, rotation position, or linear position display memory and control suitable for use in the control system illustrated in FIG. 6.

The bend angle display memory and control, the rotational angle display memory and control and the linear position display memory and control are all similar. FIG. 9 is an exemplary embodiment of one of these subsystems and includes: a temporary storage register 281; a memory 283; and, a multiplexer 285. The BCD input data from the input data accumulator 251, received via the BCD input data bus 220, is applied to the data input of the temporary storage register. The temporary storage register also receives the CLEAR and LOAD control signals produced by the temporary storage register control 267 (FIG. 8). The BCD output of the temporary storage register is applied to the data input of the memory 283 and to one data input of the multiplexer 285. The data output of the memory 283 is applied to a second data input of the multiplexer 285. The output of the multiplexer is applied to the appropriate memory position data display, i.e., bend angle, rotational position or linear position data display. The address input of the memory 283 receives the ADDRESS signal produced by the bend number and final bend number display and memory control illustrated in FIG. 10 and hereinafter described. The memory 283 further receives the MEMORY ENABLE and WRITE ENABLE control signals produced by the memory control 265. Finally, the multiplexer 285 receives a MODE SELECT signal produced by the mode selector 263.

In operation, as previously discussed, the BCD input data produced by the accumulator is automatically shifted through the temporary storage register 281 to the memory 283 if the data is produced by the card reader. In this regard, LOAD and CLEAR signals are alternately produced by the temporary storage register control as a result of the receipt of suitable signals from the system control 261. Thereafter, the system control, also in sequence, causes the memory control 265 to produce WRITE ENABLE signals that cause the memory to read data from the temporary storage register into a storage bin defined by the address present at the time of such reading. The address, of course, changes for each set of bend data.

Also as previously discussed, in the manual mode of operation, the temporary storage register 281 stores information for a particular bend until the operator actuates the store data switch 93 to transfer the data to the memory 283. More specifically, as previously discussed, when data is inserted via the keyboard, it is first stored in the input data accumulator 251. After the operator verifies that the data is correct, by reading the manual data input display, he causes the data to be transferred from the input data accumulator into the temporary storage by actuating the related bend number, bend angle, linear position, rotational position or final bend number switch. After an entire set of bend data, i.e., all of the data related to a particular bend number, has been entered the operator actuates the store data switch, which causes the memory control 265 to produce a WRITE ENABLE signal. The WRITE ENABLE signal causes the data to be transferred from the temporary storage registers 281 to the memories 283 of the bend angle, rotational angle and linear position memory and controls 223, 225 and 227 at the address denoted by the ADDRESS signal. This sequence of events occurs for each set of bend data.

The operator has the ability to view data from either the temporary storage registers or the memories. Such selection is controlled by the MODE SELECT signal applied to the multiplexers 285. When data is being entered, data held in the temporary storage registers is automatically displayed. In the display and operate modes of operation data stored in the memories at the address of the ADDRESS signal is also automatically displayed. The display data switch 85 must be actuated for data to be displayed after data has been stored, when it is desired to review the data, but not cause bend angle control signals to be produced.

Figure 10:
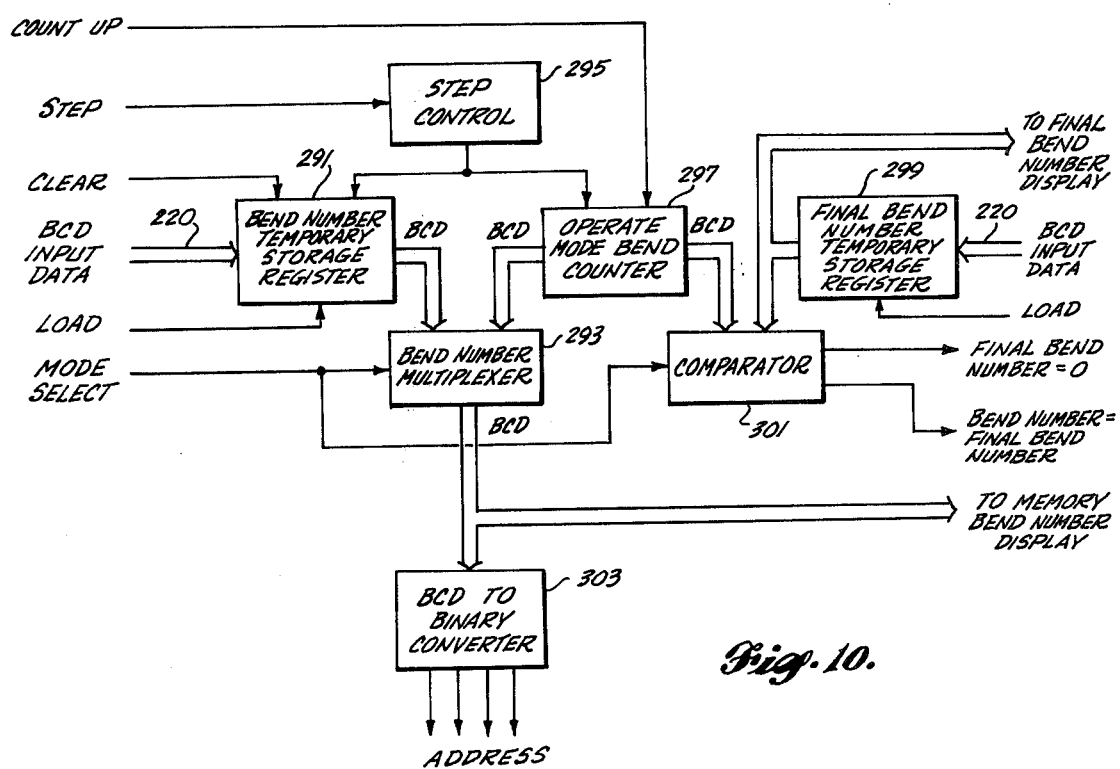
FIG. 10 is a block diagram of a bend number and final bend number display memory and control suitable for use in the control system illustrated in FIG. 6.

FIG. 10 is a block diagram of a bend number and final bend number display memory and control suitable for use in the control system illustrated in FIG. 6 and comprises: a bend number temporary storage register 291; a bend number multiplexer 293; a step control 295; an operate bend counter 297; a final bend number temporary storage register 299; a comparator 301; and a BCD to binary converter 303.

The bend number temporary storage register 291 receives bend number data via the BCD input data bus 220. The bend number data is loaded into the bend number temporary storage register when the temporary storage register control 267 produces a load signal. The data output of the bend number temporary storage register is connected to one data input of the bend number multiplexer 293. A STEP control signal, produced when the step data switch 91 located on the operator console 53 is actuated, is applied to the step control. The step control is connected to the bend number temporary storage register 291 and to the operate mode bend counter 297. The step control senses the actuation of the step switch and produces a pulse in accordance therewith. These pulses cause the bend number temporary storage register and the operate mode bend counter 297 to increment by one. Which counter value is actually used is determined by the nature of the MODE SELECT signal applied to the bend number multiplexer 293 as hereinafter described.

The operate mode bend counter 297 also receives the COUNT-UP signals produced by the bend sequencing circuit 269. This signal is also a pulse signal that causes the operator mode bend counter to increment by one for each pulse. The data output of the operate mode bend counter, which is in BCD form, is applied to the second data input of the bend number multiplexer 293 and to one input of the comparator 301.

The data input of the final bend number temporary storage register 299 is connected to receive final bend number data via the BCD input data bus 220. The bend number temporary storage register 299 receives a LOAD signal when the final bend number switch 77 located on the operator's console 53 is actuated. As a result, when the operator inserts the final bend number, he actuates the final bend number switch 77 whereby the number is stored in the final bend number temporary storage register 299. The bend number temporary storage register 291 receives the same data previously when the bend number switch is actuated. (This action takes place automatically when data is inserted via the card reader.) The data output of the final bend number temporary storage register is applied to the final bend number display and to the second input of the comparator 301. The comparator, when enabled by a suitable MODE SELECT signal, compares its two inputs and produces two outputs—one when the final bend number equals zero and the other when the bend number equals the final bend number.

The output of the multiplexer 293 is applied to the input of the BCD to binary converter 303 and to the bend number data display. Which input of the multiplexer is actually connected to its output is determined by the nature of a MODE SELECT control signal applied to the multiplexer. The BCD to binary converter 303 produces (in parallel) the ADDRESS signals applied to the bend angle display memory and control 223, the rotational angle display memory and control 225, the linear position display memory and control 227, the bend angle control 229, the linear position control 231 and the rotational position control 233. The ADDRESS signal is, thus, related to a count value which, in turn, is related to a bend number.

In operation, when either the operator or the card reader creates any bend number data, other than the final bend number data, the bend number temporary storage register 291 is loaded with the bend number. During data entry, that bend number, via the multiplexer (which is conditioned to pass the data stored in the bend number temporary storage register as a result of receiving a suitable MODE SELECT signal) causes the BCD to binary converter to produce a particular address. When subsequently entered bend angle, rotational angle and linear position data are transferred from their related temporary storage registers 281 to their related memories 283, the data is stored in bins defined by the ADDRESS output of the BCD to binary converter. Thus, all such data is stored at the same address, but in different memories. When the bend number data is entered, it also causes a common address for each memory to be produced. The final bend number is stored in the final bend number temporary storage register 299. This storage is temporary only in the sense it is automatically erased and a new final bend number entered any time one becomes available and the final bend number temporary storage register is enabled by a LOAD signal.

After all of the bend data is entered and stored, it can be displayed by merely actuating the display and step switches. Each time the step switch is actuated, the operate mode bend counter 297 is incremented by one. These counts are read out in BCD form and cause the BCD to binary converter to produce ADDRESS signals in sequence. Of course, the MODE SELECT signal is such that the bend number multiplexer passes the BCD information produced by the operate mode bend counter 297. Thus, the count value stored in the operate mode bend counter 297 causes a related binary ADDRESS signal to be produced. The ADDRESS signals plus the MODE SELECT signal cause the memories to produce related bend angle, rotational angle and linear position data for display. In a similar manner, each COUNT-UP pulse, created during the operate mode each time the operate switch is actuated and the bend made in the manner previously described, causes the operate mode bend counter 297 to increment by one and change the ADDRESS signal. As a result, the address for the bend data related to the next bend is automatically created by the BCD to binary converter 303 at the end of a bend sequence, and the related bend data automatically displayed. Also, the bend number temporary storage register is incremented during the display data sequence by merely actuating the step data switch 91.

As discussed above, the comparator 301 compares the data produced by the operate mode bend counter 297 output with the data produced by the final bend number temporary storage register 299. When the operate mode bend counter data is at zero, i.e., the final bend number equals zero, a final bend number equals zero signal is produced by the comparator and applied to the bend sequencing circuit 269. When the bend number data produced by the operate mode bend counter 297 is equal to the final bend number, the comparator produces the bend number equal to final bend number signal. This signal, as previously described, is also applied to the bend sequencing circuit 269.

Figure 11:
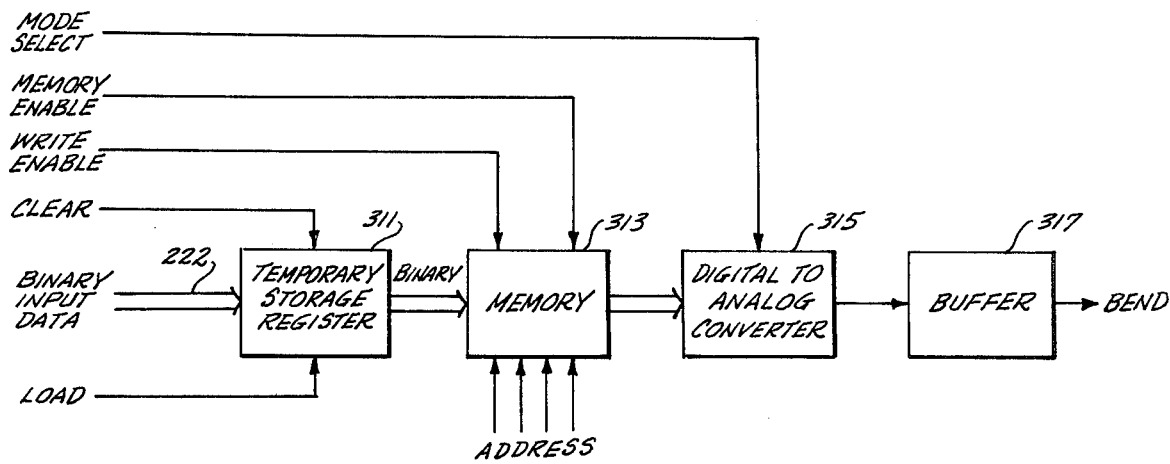
FIG. 11 is a block diagram of a bend angle control suitable for use in the control system illustrated in FIG. 6.

FIG. 11 is a block diagram of a bend angle control 229 suitable for use in the control system illustrated in FIG. 6 and comprises: a temporary storage register 311; a memory 313; a digital-to-analog converter 315; and, a buffer 317. The temporary storage register receives the binary data produced by the BCD to binary converter and inrange detector 253 of the data entry, conversion and magnitude check subsystem 218, via the binary data bus 222. In addition, the temporary storage receives CLEAR and LOAD signals from the temporary storage register control 267 of the controller. The binary data output of the temporary storage register 311 is applied to the data input of the memory 313. The memory 313 also receives ADDRESS signals from the bend number and final bend number display memory and control, illustrated in FIG. 10 and heretofore described; and, MEMORY ENABLE and WRITE ENABLE signals from the memory control 265. The data output of the memory 313 is applied to the digital-to-analog converter. The digital-to-analog converter is enabled by a suitable MODE SELECT signal produced by the mode selector 263. The analog output of the digital-to-analog converter is applied to the input of the buffer 317. The output of the buffer 317 is the bend signal applied to the bend control mechanism of the bender.

In operation, as with the bend angle display memory and control 223, received bend angle data is temporarily stored in the temporary storage register 311 of the bend angle control 229, if it is being manually inserted. If such data is being received from the card reader, it automatically flows through the temporary storage register 311 to the memory 313 as a result of the temporary storage register control 267 alternately creating appropriate LOAD and CLEAR signals. In any event, the memory automatically stores bend angle data in bins located at ADDRESSES defined by the related bend number. The memory, of course, is enabled by the memory control 265 producing WRITE ENABLE signals at suitable intervals. The intervals may be controlled, i.e., occur when the store data switch is actuated, or automatic when card reader data is being received, as previously described. The MODE SELECT signal enables the digital-to-analog converter when the operate switch is actuated. The digital-to-analog converter converts into analog form the digital data stored in memory 313, at the address determined by the nature of the ADDRESS signal. These analog signals are buffered by the buffer 317 and then used to control the bending operation of the bend mechanism.

Figure 12:
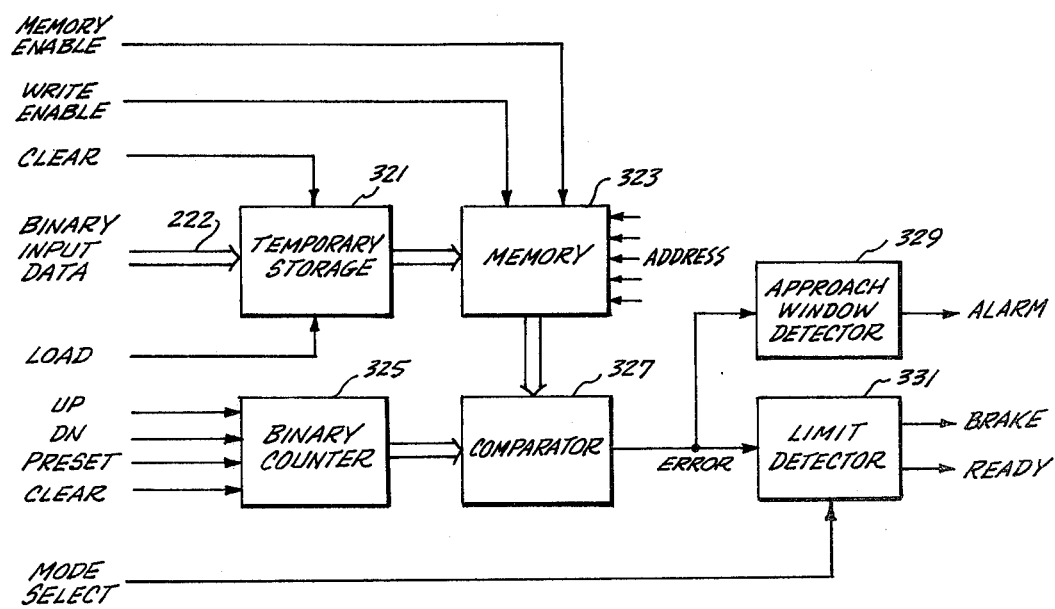
FIG. 12 is an examplary block diagram of a linear or rotational position control suitable for use in the control system illustrated in FIG. 6.

The linear position control 231 and the rotational position control 233 are identical. FIG. 12 is a block diagram of an exemplary embodiment of a linear position control or a rotational position control suitable for use in the control system illustrated in FIG. 6. The position control illustrated in FIG. 12 comprises: a temporary storage register 321; a memory 323; a binary counter 325; a comparator 327; an approach window detector 329; and, a limit detector 331.

The temporary storage register 321 receives the binary input data for the related function (i.e., linear position, rotational position) produced by the BCD to binary converter and in-range detector 253. More specifically, when the temporary storage register receives a LOAD signal, it loads the binary information present on the binary input data bus 222. The temporary storage register data is shifted to the memory 323 in the manner previously described. That is, after keyboard instructed temporary storage register data has been verified as correct, by the operator checking the same data stored in the temporary storage registers of the related rotational or linear position display memory and control 225 or 227, the binary data is shifted from the temporary storage register 321 to the memory 323 at the same BCD data is transferred in the related display memory and control. Of course, the memory address is defined by the same bend number related ADDRESS signal.

The binary counter 325 receives up/down, preset and clear signals from the related linear or rotational encoder detector and display control 235 or 237, produced in the manner hereinafter described. In accordance therewith, the binary counter produces a data output signal related to the actual linear or rotational position of the tube with respect to a reference position, e.g., the length of the tube. This data output is applied to one input of the comparator 327. The output of the memory 323 is applied to the second input of the comparator. The comparator compares its two inputs and produces an error signal related to the difference therebetween. The error signal is applied to the approach window detector 329 and to the limit detector 331. When the error signal decreases to a predetermined level that falls within the "window" of the approach window detector, the approach window detector 329 produces an alarm signal that actuates the visual and audio approach warning indicator 210. As noted above, the visual indicator includes the −1.00, +1.00 and −10°, +10° lights on the operators console; and, the audio indicator includes the speakers 107 and 108. The warnings advise the operator that the appropriate tube position is being approached. When the appropriate tube position is reached, the error signal reduces to zero. When this happens, the limit detector produces a brake signal that causes the related brake (rotary or linear) to be actuated (e.g., locked). In addition, when the error signal reduces to zero, the limit detector produces a ready signal that causes the related ready light to be lit.

The limit detector, is only enabled when it receives a suitable MODE SELECT signal. Such a signal is produced when the operator actuates the operate switch on the control console 53. As a result, the brake and ready signals are not produced when the operator is merely entering data or causing the information to be displayed for checking purposes. However, when a tube is being bent, i.e., the system is in the operate mode of operation, the limit detector 331 is enabled.

Figure 13:
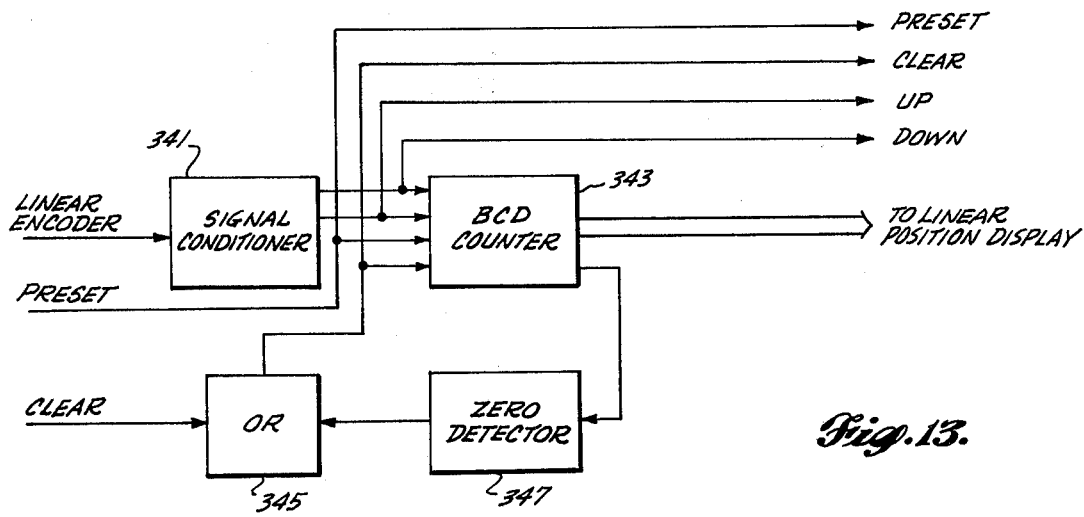
FIG. 13 is a block diagram of a linear encoder detector and display control suitable for use in the control system illustrated in FIG. 6; and, FIG. 14 is a block diagram of a rotational encoder detector and display control suitable for use in the control system illustrated in FIG. 6.

FIG. 13 is a block diagram of a linear encoder detector and display control 235 suitable for use in the control system illustrated in FIG. 6 and comprises: a signal conditioner 341; a presettable BCD counter 343; a two-input OR gate 345; and a zero detector 347. The preset switch 76 located beneath the encoder linear position display 65 is connected to control the application of a PRESET signal to the preset input of the BCD counter 343. When this preset switch is appropriately actuated, the BC D counter is preset to a predetermined value in a conventional manner. This value will be displayed on the encoder linear position display 65 because the data output of the BCD counter 343 is connected to the encoder linear position display. The output of the linear encoder is applied to the input of the signal conditioner 341. The signal conditioner conditions the linear encoder signal and in accordance therewith produces UP and DN signals when the linear encoder senses longitudinal movement, one pulse for each increment of movement regardless of the rate of movement. The UP/DN signals are applied to the up and down inputs of the BCD counter. Thus, as the tube is moved longitudinally the count value is incremented or decremented depending upon the direction of movement. The data output of the BCD counter is also applied to the zero detector 347. When the zero detector detects a zero output of the BCD counter, meaning that the collet has reached the bending mechanism (or some other predetermined reference position) it applies a signal to one input of the OR gate 345. The output of the OR gate 345 is connected to the clear input of the BCD counter 353. Thus, any time the tube reaches a zero position, the BCD counter is cleared.

The actuation of the clear switch 78 located beneath the encoder linear position display 65 also causes a clear pulse to occur. This pulse is applied to the second input of the OR gate 345. Thus, the BCD counter is also cleared when the clear switch is actuated.

The UP/DN outputs of the signal conditioner, the PRESET signal and the output of the OR gate (CLEAR) are also applied to the related inputs of the binary counter 325 of the linear position control 231. Thus, the binary counter 325 of the linear position control contains the same information, and is operated in the same manner, as the BCD counter 343 of the linear encoder detector and display control 235.

In operation, the BCD counter 343 is first preset to some value related to table position. Thereafter, as the tube is moved, the linear encoder causes the BCD to count up or count down, depending upon the direction of linear movement. The tube's linear position is continuously displayed on the encoder linear position display 65. When the BCD counter counts down to zero from a predetermined position, the zero detector automatically causes the BCD counter to be cleared. As a result, the display cannot be controlled to show a negative position. Alternatively, the clear switch on the operator's console can be used to clear the BCD counter. At the same time, of course, the binary counter 325 of the linear position control 231 is cleared.

Figure 14:
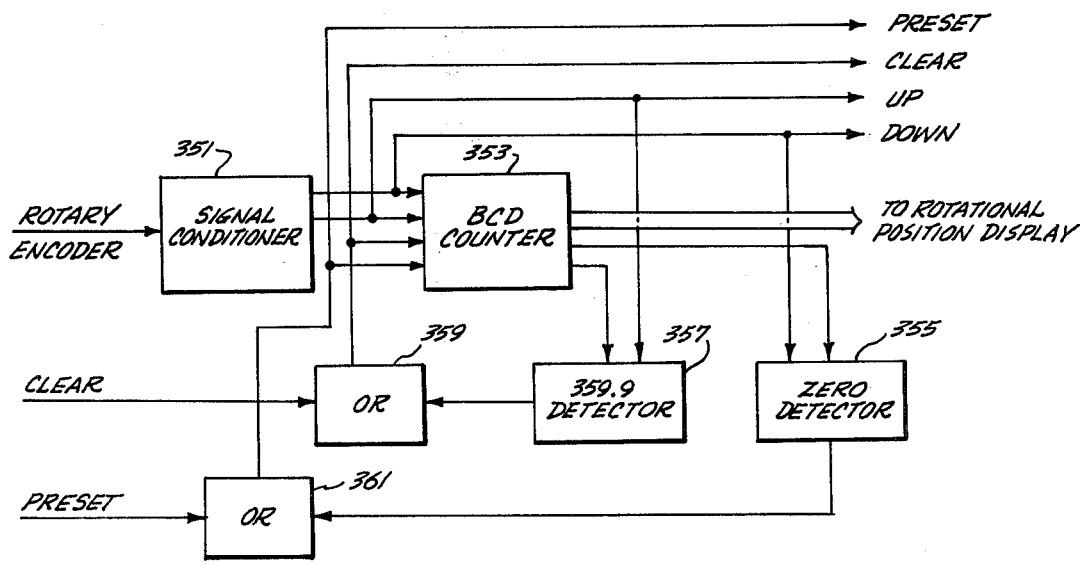

FIG. 14 is a block diagram of a rotational encoder detector and display control 237 suitable for use in the control system illustrated in FIG. 6 and comprises: a signal conditioner 351; a BCD counter 353; a zero detector 355; a 359.9 detector 357; and, two two-input OR gates 359 and 361. The signal conditioner 351 receives the signal produced by the rotary encoder and conditions it. The output of the signal conditioner comprises UP and DN pulses that are applied to the up and down inputs of the BCD counter 353. The data output of the BCD counter is applied to the encoder rotational position display 67.

The zero detector 355 is connected to the data output of the BCD counter 353 and to the DN output of the signal conditioner 351 so as to detect when the counter output denotes zero degrees, which may be a reference position, when the output is moving in a down or negative direction. The output of the zero detector is applied to one input of the first OR gate 359. The preset switch 80 located beneath the encoder rotational position display 67 controls the signal applied to the second input of the OR gate 359. The output of the OR gate 359 is applied to the preset input of the BCD counter 353.

The 359.9 detector is connected to the output of the BCD counter 353 and to the UP output of the signal condition 351 so as to detect when the count value of the BCD counter denotes that the tube is at a 359.9° position, approached from an UP or positive direction. The output of the 359.9 detector is applied to one input of the second OR gate 361. The clear switch 82 located beneath the encoder rotational position display 67 on the operator's console 53 controls the signal applied to the second input of the second OR gate 361. The output of the second OR gate 361 is applied to the clear input of the BCD counter 353. The outputs of the signal conditioner (UP and DN) and the outputs of the first and second OR gates (preset and clear) are also applied to the up/down, preset and clear inputs of the binary counter 325 and the rotational position control 233. Thus, the BCD counter 353 contains the same count value in BCD form as the binary counter 325 of the rotational position control 233 contains in binary form.

In operation, when the zero detector detects that the tube has been rotated toward and has reached zero degrees, the zero detector automatically presets the counter to a preset value of 359.9. When the 359.9 detector detects that the tube has been rotated toward and has reached 359.9° from the reference (zero) position, the 359.9 detector clears the BCD counter. In this manner all angles to 0.1° between zero and 360° are covered, without overlap. Thus, the output of the BCD counter 353 always represents the true position of the tube with respect to a "zero" position.

It will be appreciated from the foregoing description that the invention provides a semiautomatic control system for tube bending machines. An operator console is used as the man/machine interface with a control system. The system allows an operator to manually insert tube bend data including an identifying bend number. Alternatively, a card reader can be used to insert bend data stored on cards. Still further other types of data storage mediums, such as magnetic tapes, punched tapes, etc., can be utilized. Data entered from a storage medium is automatically stored in memories, each related to the particular type of data received e.g., bend angle, linear position etc. Manually entered data is temporarily stored until an entire set of bend data has been entered—then the data is moved to memories. Each individual piece of data can be checked as it is being manually entered. After being entered, the data can be displayed for checking purposes without the bending mechanism being operated. After the data is stored, it is utilized to control the operation of brakes and related displays during bending. Also during bending, encoders determine the actual position of a tube as it is being manually moved by the operator; and, the actual tube position both linearly and rotationally is continuously displayed. When the tube reaches desired linear and rotational positions, independent linear and rotational brakes are actuated. After both brakes have been actuated, the operator actuates a tube bender cycle forward switch that causes the linear brake to be released and the bend to be made. After one bend is made, the display data from memory is automatically replaced with the next set of bend data. At the same time the rotary brake is released and the tube is free to be moved by the operator to the next bend position. When the next bend position is reached, the brakes again lock and the operator actuates the tube bender cycle foward switch, causing the next bend to be made. This sequence continues until the final bend is made. After the final bend is made, the brakes are unlocked and the tube is free to be removed.

It will be appreciated that apparatus formed in accordance with the invention is substantially less expensive than N/C control systems that are fully automated, since the invention does not require the inclusion of mechanisms adapted to control the actual position of a tube. Moreover, the invention eliminates the inaccuracy disadvantages of mechanical stop systems, as discussed above. In addition, it has been found that the rate of production using the present invention, when compared to fully automatic tube benders is essentially the same. That is, a skilled operator can manually control the bending machine and produce parts at a rate comparable to the rate of part production of fully automated machines, with the same degree of accurracy.

While a preferred embodiment of the invention has been illustrated and described, it is to be understood that various changes can be made therein without departing from the spirit and scope of the invention. For example, in some systems it may be desirable to combine the functions of the display memory and control subsystems 223, 225 and 227 with the functions of the controls 229, 231 and 233. Further, the system may use binary or BCD data entirely rather than a combination of binary and BCD data. Hence, within the scope of the appended claims, the invention can be practiced otherwise than as specifically described herein.

We claim:

1. A semiautomatic, manually operated, tube bending machine comprising:
   (A) a tube bending mechanism including:
   (1) supporting means for supporting a tube such that said tube can be manually positioned prior to bending;
   (2) bending means for bending a tube in accordance with a bend control signal;
   (3) locking means for locking a tube supported by said supporting means in a fixed position prior to bending; and,
   (4) position sensing means for sensing the position of a tube supported by said supporting means and producing position information related thereto; and,
   (B) a control subsystem connected to said tube bending mechanism for determining when said tube has been manually moved to the correct position for bending by said bending means, warning an operator when said correct position is being approached, actuating said locking means when said correct position is reached and operating said bending means in accordance with manual operator control, said control subsystem including:
   (1) data receiving means for receiving at least one set of bend data that defines bend position and bend angle;
   (2) data storage and comparing means for storing said at least one set of bend data, comparing stored bend position data with the position information produced by said position sensing means and actuating said locking means when said stored bend position data compares with said position information;
   (3) manually operable bend actuate means for producing a bend actuate signal when manually operated;
   (4) bend control means connected to said manually operable bend actuate means for producing a bend control signal when said manually operable bend actuate means is manually actuated, said bend control signal being applied to said bending means so as to cause said bending means to bend said tube; and,
   (5) warning means connected to said data storage and comparing means for producing a warning when a tube, as it is manually moved, causes said position information produced by said position sensing means to denote that said tube is approaching the positions defined by said stored bend position data.

2. A semiautomatic, manually operated, tube bending machine as claimed in claim 1 including display means connected to said data storage and comparing means and said position sensing means for displaying the bend position data stored in said data storage and comparing means and the actual position of said tube as determined by said position sensing means.

3. A semiautomatic, manually operated, tube bending machine as claimed in claim 2 wherein said bend position data received by said data receiving means includes linear position data and rotational position data and wherein said position sensing means includes a linear sensor for sensing the linear position of said tube and producing linear information in accordance therewith, and a rotary sensor for sensing the rotational position of said tube and producing rotational information in accordance therewith.

4. A semiautomatic, manually operated tube bending machine as claimed in claim 3 wherein said locking means includes a linear brake for locking said tube in a linear position along its longitudinal axis and a rotary brake for locking said tube in a rotational position about its longitudinal axis.

5. A semiautomatic, manually operated, tube bending machine as claimed in claim 4 wherein said data receiving means receives a plurality of sets of bend data, each set defining a linear bend position, a rotational bend position and a bend angle; and, wherein said data storage and comparing means stores said plurality of sets of bend data.

6. A semiautomatic, manually operated, tube bending machine as claimed in claim 5 wherein each of said plurality of sets of bend data also includes bend number data and wherein said data storage and comparing means includes address means for producing a unique address for each bend number data, said address defining the storage positions at which related linear position data, rotational position data and bend angle data are stored.

7. A semiautomatic, manually operated, tube bending machine as claimed in claim 6 wherein said data storage and comparing means includes:
- a bend number display memory and control for receiving bend number data and for producing said addresses in accordance therewith;
- a bend angle display memory and control for receiving bend angle data, said bend angle display memory and control including an addressable multiple bin memory connected to receive the address produced by said bend number display memory and control, and store and produce bend angle data at said addresses;
- a rotational position display memory and control for receiving rotational position data, said rotational position display memory and control including an addressable multiple bin memory connected to receive the addresses produced by said bend number display memory and control, and store and produce rotational position data at said address; and,
- a linear position display memory and control for receiving linear position data, said linear position display memory and control including an addressable multiple bin memory connected to receive the addresses produced by said bend number display memory and control, and store and produce linear position data at said addresses.

8. A semiautomatic, manually operated, tube bending machine as claimed in claim 7 wherein said display means includes:
- a bend number display connected to said bend number display memory and control for displaying the bend number related to the address being produced by said bend number display memory and control;
- a bend angle display connected to said bend angle display memory and control for displaying the bend angle stored at the address produced by said bend number display memory and control;
- a rotational position display connected to said rotational position display memory and control for displaying the rotational position stored at the address produced by said bend number display memory and control; and,
- a linear position display connected to said linear position display memory and control for displaying the linear position stored at the address produced by said bend number display memory and control.

9. A semiautomatic, manually operated, tube bending machine as claimed in claim 8 wherein said bend number display memory and control includes a final bend number storage means for storing the final bend number and wherein said display means includes a final bend number display connected to said final bend number storage means for displaying the final bend number stored in said final bend number storage means.

10. A semiautomatic, manually operated, tube bending machine as claimed in claim 9 wherein said display means includes an encoder linear position display connected to said linear sensor for displaying the actual linear position of said tube; and, an encoder rotational position display connected to said rotary sensor for displaying the actual rotational position of said tube.

11. A semiautomatic, manually operated, tube bending machine as claimed in claim 10 wherein said warning means includes warning indicators connected to said data storage and comparing means for producing a warning when said tube, as it is manually moved, approaches the positions at which said linear and rotational brakes will lock.

12. A semiautomatic, manually operated tube bending machine as claimed in claim 11 including ready indicators connected to said data storage and comparing means so as to be actuated when said linear and rotational brakes lock.

13. A semiautomatic, manually operated, tube bending machine as claimed in claim 6 wherein said data storage and comparing means also includes:
- a bend angle control for receiving bend angle data, said bend angle control including an addressable multiple bin memory connected to receive the addresses produced by said bend number display memory and control, and store and produce bend angle data at said addresses;
- a linear position control for receiving linear position data, said linear position control including an addressable multiple bin memory connected to receive the addresses produced by said bend number display memory and control, and store and produce linear position data at said addresses; and,
- a rotational position control for receiving rotational position data, said rotational position control including an addressable multiple bin memory connected to receive the addresses produced by said bend number display memory and control, and store and produce rotational position data at said addresses.

14. A semiautomatic, manually operated, tube bending machine as claimed in claim 13 wherein:
- said linear position control also includes a comparator connected to the memory of said linear position control and to said linear sensor for comparing the linear position data stored at the address produced by said bend number display memory and control with the linear information produced by said linear sensor; and,
- said rotational position control also includes a comparator connected to the memory of said rotational position control and to said rotary sensor for comparing the rotational position stored at the address produced by said bend number display memory and control with the rotational information produced by said rotary sensor.

15. A control and display system for a tube bending machine of the type wherein a tube is manually positioned prior to each bend, said control and display system comprising:

bend data receiving means for receiving bend data;

control means for producing control signals suitable for controlling the receipt, storage and use of said bend data;

manually actuated means connected to said control means for controlling the nature of said control signals and, thus, the receipt, storage and use of said bend data;

display means for selectively displaying bend data;

display control means connected to said data receiving means and to said control means for receiving and storing bend data in accordance with said control signals and applying said stored bend data to said display means also in accordance with said control signals;

position sensing means for sensing the position of a tube;

brake means for locking said tube in a fixed position when said brake means is actuated;

brake control means connected to said bend data receiving means and said control means for receiving bend data and said control signals and connected to said brake means for actuating said brake means in accordance with said bend data and said control signals;

warning means connected to said brake control means for producing a warning prior to said brake control means actuating said brake means so as to lock said tube in a fixed position; and, bend signal producing means, suitable for controlling the bending operation of a bending machine, connected to said data receiving means and said control means for receiving bend data and control signals, and controlling the nature of said bend signal in accordance therewith.

16. A control display system for a tube bending machine as claimed in claim 15 wherein said bend data received by said bend data receiving means includes linear position data and rotational position data and wherein said position sensing means includes a linear sensing for sensing the linear position of said tube and producing linear information in accordance therewith, and a rotary sensor for sensing the rotational position of said tube and producing rotational information in accordance therewith.

17. A control and display system for a tube bending machine as claimed in claim 16 wherein said brake means includes a linear brake for locking a tube in a linear position along its longitudinal axis and a rotary brake for locking a tube in a rotational position about its longitudinal axis.

18. A control and display system for a tube bending machine as claimed in claim 17 wherein said bend data received by said receiving means includes a plurality of sets of bend data each set defining a linear bend position, a rotational bend position and a bend angle; and, wherein said display control means stores said plurality of sets of bend data.

19. A control and display system for a tube bending machine as claimed in claim 18 wherein each of said plurality of sets of bend data also includes bend number data and wherein said display control means includes address means for producing a unique address for each bend number data, said addresses defining the storage positions at which related linear position data, rotational position data and bend angle data are stored.

20. A control and display system for a tube bending machine as claimed in claim 19 wherein said display control means includes:

a bend number display memory and control for receiving bend number data and for producing said addresses in accordance therewith;

a bend angle display memory and control for receiving bend angle data, said bend angle display memory and control including an addressable multiple bin memory connected to receive the addresses produced by said bend number display memory and control, and store and produce bend angle data at said addresses;

a rotational position display memory and control for receiving rotational position data, said rotational position display memory and control including an addressable multiple bin memory connected to receive the addresses produced by said bend number display memory and control, and store and produce rotational position data at said address; and, a linear position display memory and control for receiving linear position data, said linear position display memory and control including an addressable multiple bin memory connected to receive the addresses produced by said bend number display memory and control, and store and produce linear position data at said addresses.

21. A control and display system for a tube bending machine as claimed in claim 20 wherein said display means includes:

a bend number display connected to said bend number display memory and control for displaying the bend number related to the address being produced by said bend number display memory and control;

a bend angle display connected to said bend angle display memory and control for displaying the bend angle stored at the address produced by said bend number display memory and control;

a rotational position display connected to said rotational position display memory and control for displaying the rotational position stored at the address produced by said bend number display memory and control; and, a linear position display connected to said linear position display memory and control for displaying the linear position stored at the address produced by said bend number display memory and control.

22. A control and display system for a tube bending machine as claimed in claim 21 wherein said bend number display memory and control includes a final bend number storage means for storing the final bend number and wherein said display means includes a final bend number display connected to said final bend number number storage means for displaying the final bend number stored in said final bend number storage means.

23. A control and display system for a tube bending machine as claimed in claim 22 wherein said display means includes an encoder linear position display connected to said linear sensor for displaying the actual linear position of a tube; and, an encoder rotational position display connected to said rotary sensor for displaying the actual rotational position of said tube.

24. A control and display system for a tube bending machine as claimed in claim 23 wherein said warning means includes warning indicators connected to said brake control means for producing a warning when a tube, as it is manually moved, approaches the position at which said linear and rotational brakes will lock.

25. A control and display system for a tube bending machine as claimed in claim 24, including ready indicators connected to said brake control means so as to be actuated when said linear and rotational brakes lock.

26. A control and display system for a tube bending machine as claimed in claim 19 wherein:
(A) said bend signal producing means includes a bend angle control for receiving bend angle data, said bend angle control including an addressable multiple bin memory connected to receive the addresses produced by said address means of said display control means, and store and produce bend angle data at said addresses; and,
(B) said brake control means includes:
  (1) a linear position control for receiving linear position data, said linear position control including an addressable multiple bin memory connected to receive the addresses produced by said address means of said display control means, and store and produce linear position data at said addresses; and,
  (2) a rotational position control for receiving rotational position data, said rotational position control including an addressable multiple bin memory connected to receive the addresses produced by said address means of said display control means, and store and produce rotational position data at said addresses.

27. A control and display system for a tube bending machine as claimed in claim 26 wherein:
said linear position control also includes a comparator connected to the memory of said linear position control and to said linear sensor for comparing the linear position data stored at the address produced by said address means of said display control means with the linear information produced by said linear sensor; and,
said rotational position control also includes a comparator connected to the memory of said rotational position control and to said rotary sensor for comparing the rotational position stored at the address produced by said address means of said display control means with the rotational information produced by said rotary sensor.

28. A control and display system for a tube bending machine as claimed in claim 27 wherein said display means includes:
a bend number display connected to said display control means for displaying the bend number related to the address being produced by said address means of said display control means;
a bend angle display connected to said display control means for displaying the bend angle data stored at the address produced by said address means of said display control means;
a rotational position display connected to said display control means for displaying the rotational position data stored at the address produced by said address means of said display control means; and,
a linear position display connected to said display control means for displaying the linear position data stored at the address produced by said address means of said display control means.

29. A control and display system for a tube bending machine as claimed in claim 16 wherein said display means includes an encoder linear position display connected to said linear sensor for displaying the actual linear position of a tube and an encoder rotational position display connected to said rotary sensor for displaying the actual rotational position of said tube.

30. A control and display system for a tube bending machine as claimed in claim 15 wherein said warning means includes warning indicators connected to said brake control means for producing a warning when a tube, as it is manually moved, approaches the position at which said brake means locks.

31. A control and display system for a tube bending machine as claimed in claim 30 including ready indicators connected to said brake control means so as to be actuated when said brake means locks.

* * * * *

UNITED STATES PATENT AND TRADEMARK OFFICE
CERTIFICATE OF CORRECTION

PATENT NO. : 4,131,003
DATED : December 26, 1978
INVENTOR(S) : Foster et al.

It is certified that error appears in the above–identified patent and that said Letters Patent are hereby corrected as shown below:

Col. 5, line 20, delete "rotational" and insert —Rotational—.
Col. 7, line 60, after "lock" insert —the—.
Col. 8, line 17, delete "connected" (first occurrence).
Col. 9, line 5, delete "an" (first occurrence);
Col. 9, line 65, after "CLEAR" insert —,—.
Col. 11, line 11, delete "heretofor" and insert —heretofore—;
Col. 11, line 26, delete "signal" and insert —signals—;
Col. 11, line 50, delete "rotation" and insert —rotational—.
Col. 13, line 4, delete "device" and insert —devices—.
Col. 14, line 1, delete "state it," and insert —state, it—.
Col. 15, line 44, delete "end-to-bend" and insert —end of bend—.
Col. 20, line 46, delete "at" and insert —as—.
Col. 21, line 2, delete "operators" and insert —operator's—;
Col. 21, line 30, delete "BC D" and insert —BCD—.
Col. 23, line 65, delete "We claim:" and insert —The embodiments of the invention in which an exclusive property or privilege is claimed are defined as follows:—.
Col. 25, line 29, delete "address" and insert —addresses—.
Col. 27, line 43, delete "sensing" (first occurrence) and insert —sensor—.

Signed and Sealed this

Seventeenth Day of July 1979

[SEAL]

Attest:

LUTRELLE F. PARKER
*Attesting Officer*    *Acting Commissioner of Patents and Trademarks*